(12) United States Patent
Roh et al.

(10) Patent No.: US 12,003,064 B2
(45) Date of Patent: Jun. 4, 2024

(54) ELECTRONIC PART WITH INTEGRATED FUSE

(71) Applicant: YURA CO., LTD., Hwaseong-si (KR)

(72) Inventors: Myoung Kun Roh, Gunpo-si (KR); Il Kwon Park, Seongnam-si (KR)

(73) Assignee: YURA CO., LTD., Hwaseong-si (KR)

( * ) Notice: Subject to any disclaimer, the term of this patent is extended or adjusted under 35 U.S.C. 154(b) by 281 days.

(21) Appl. No.: 17/478,169

(22) Filed: Sep. 17, 2021

(65) Prior Publication Data
US 2022/0085559 A1    Mar. 17, 2022

(30) Foreign Application Priority Data

Sep. 17, 2020   (KR) .......................... 10-2020-0119815

(51) Int. Cl.
*H01R 13/68* (2011.01)
*B60R 16/04* (2006.01)
*H01R 11/28* (2006.01)

(52) U.S. Cl.
CPC ............. *H01R 13/68* (2013.01); *B60R 16/04* (2013.01); *H01R 11/283* (2013.01)

(58) Field of Classification Search
CPC .... H01R 13/68; H01R 11/283; H01R 13/748; H01R 13/688; H01R 13/5202; B60R 16/04; B60R 16/0239; H01H 2085/208; H01H 85/0241; H01H 85/05; H01H 85/165; H01H 85/20
See application file for complete search history.

(56) References Cited

U.S. PATENT DOCUMENTS 9,774,179 B1 *   9/2017  Marcath ............... H05K 9/0045
2019/0123495 A1 *  4/2019  Darr ....................... H01R 27/02
(Continued)

FOREIGN PATENT DOCUMENTS

KR   10-2012-0040663      4/2012
KR   10-2017-0035071      3/2017
(Continued)

OTHER PUBLICATIONS

Korean Office Action with English translation for Korean Patent Application No. 10-2020-0119815, dated Feb. 10, 2022.
(Continued)

*Primary Examiner* — Jean F Duverne
(74) *Attorney, Agent, or Firm* — KILE PARK REED & HOUTTEMAN PLLC

(57) ABSTRACT

A fuse-integrated electronic component connected to a power supply part includes an outer housing fixed by a first coupling member in a state in which housings are engaged with each other to define an accommodation space and in which an extension part is disposed at one side thereof, an inner body installed in the accommodation space by a second coupling member to define a mounting space, a connector electrically connected to the outer housing so that the extension part is accommodated therein, and a fuse installed in the mounting space to cut off a high voltage output to the connector. The first coupling member is coupled and released between the outer housing and the power supply part so that the first coupling member is released in a state of being separated from the power supply part, to doubly cut off the power when the fuse is replaced.

6 Claims, 25 Drawing Sheets

(56) References Cited

U.S. PATENT DOCUMENTS

2020/0153173 A1\* 5/2020 Kurita ................ H01R 13/5219
2020/0185865 A1   6/2020 Lee et al.

FOREIGN PATENT DOCUMENTS

| KR | 10-2018-0066925 | 6/2018 |
| KR | 10-2019-0119280 | 10/2019 |
| KR | 10-2020-0070815 | 6/2020 |

OTHER PUBLICATIONS

Extended European Search Report for European Application No. 21197406.8, dated Feb. 16, 2022.

\* cited by examiner

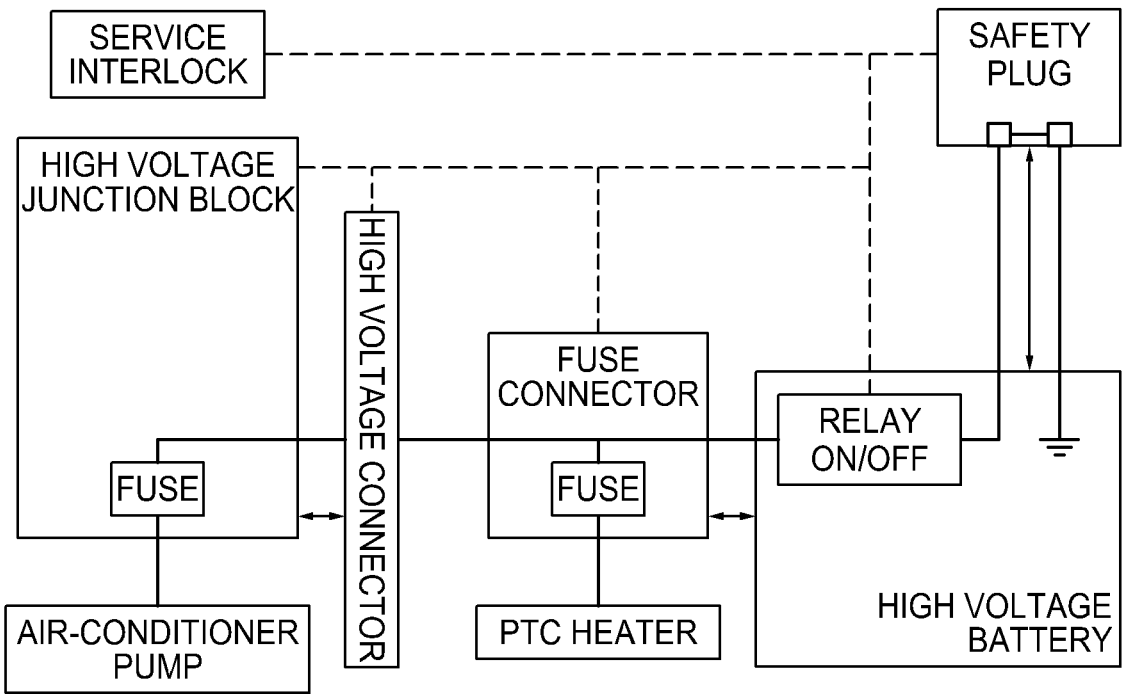
FIG. 8
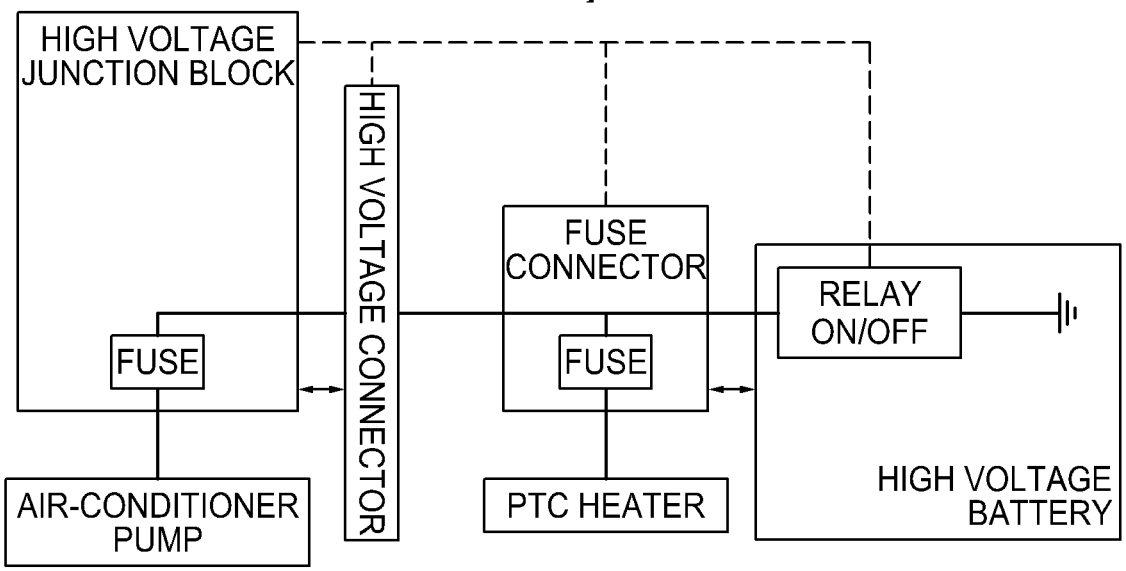
FIG. 9]

FIG. 15
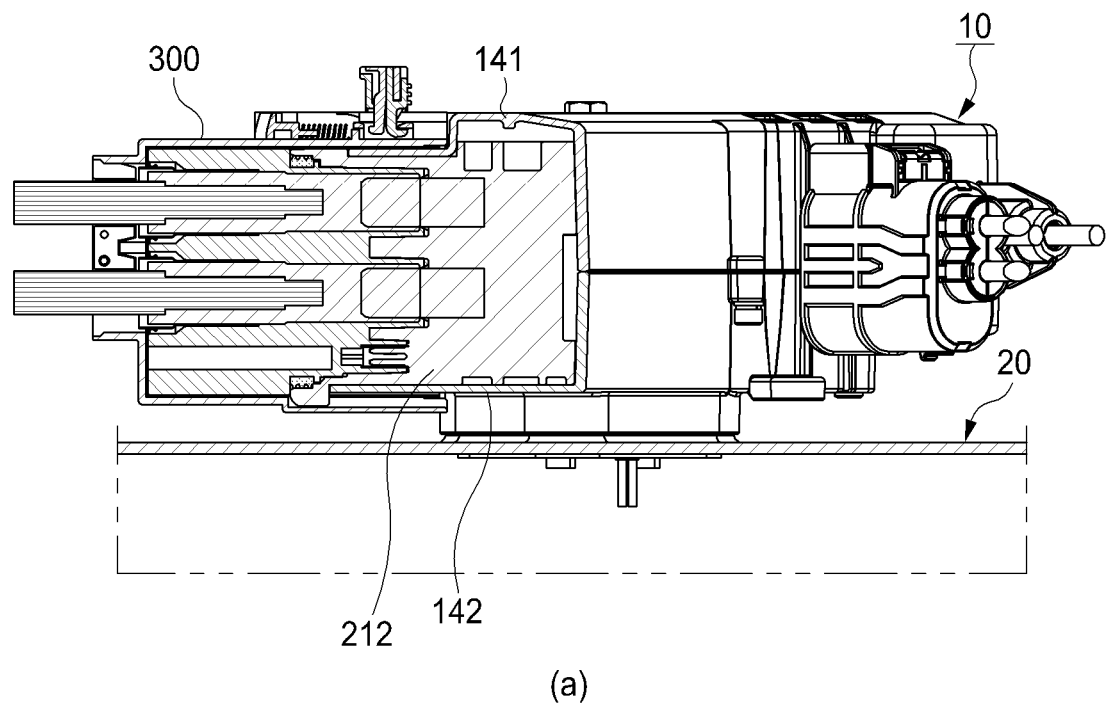
(a)
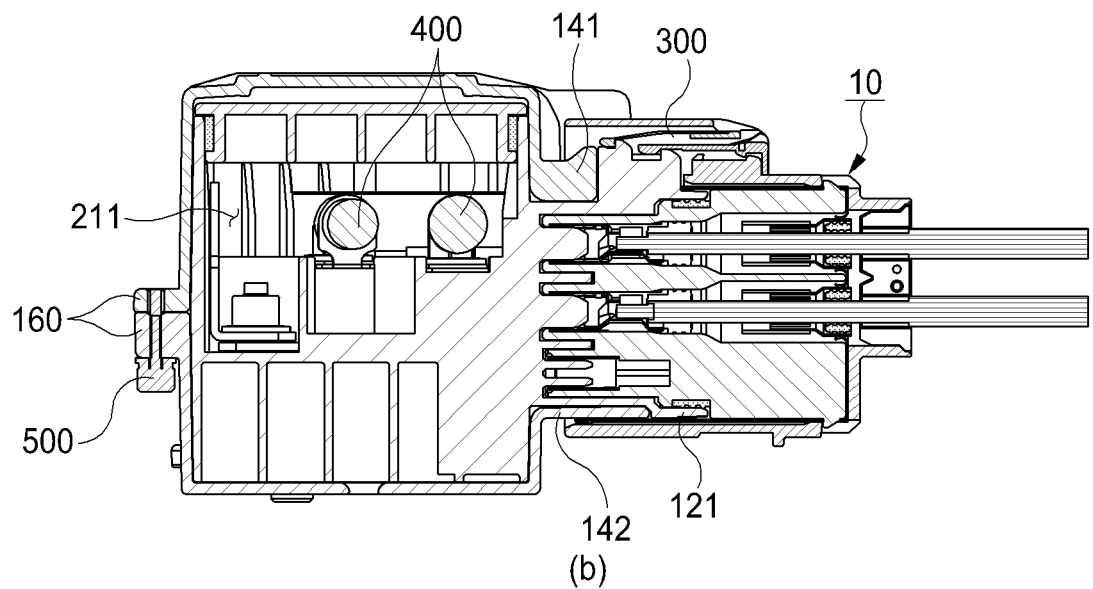
(b)

FIG. 19
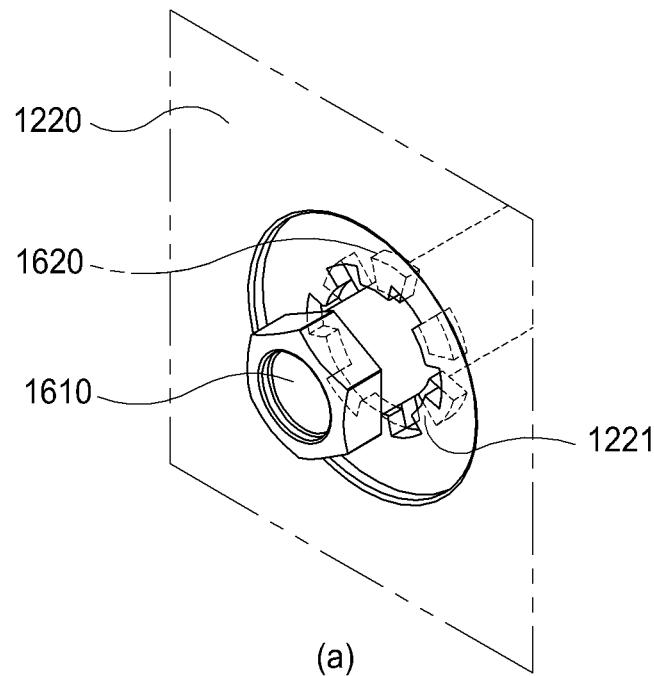
(a)
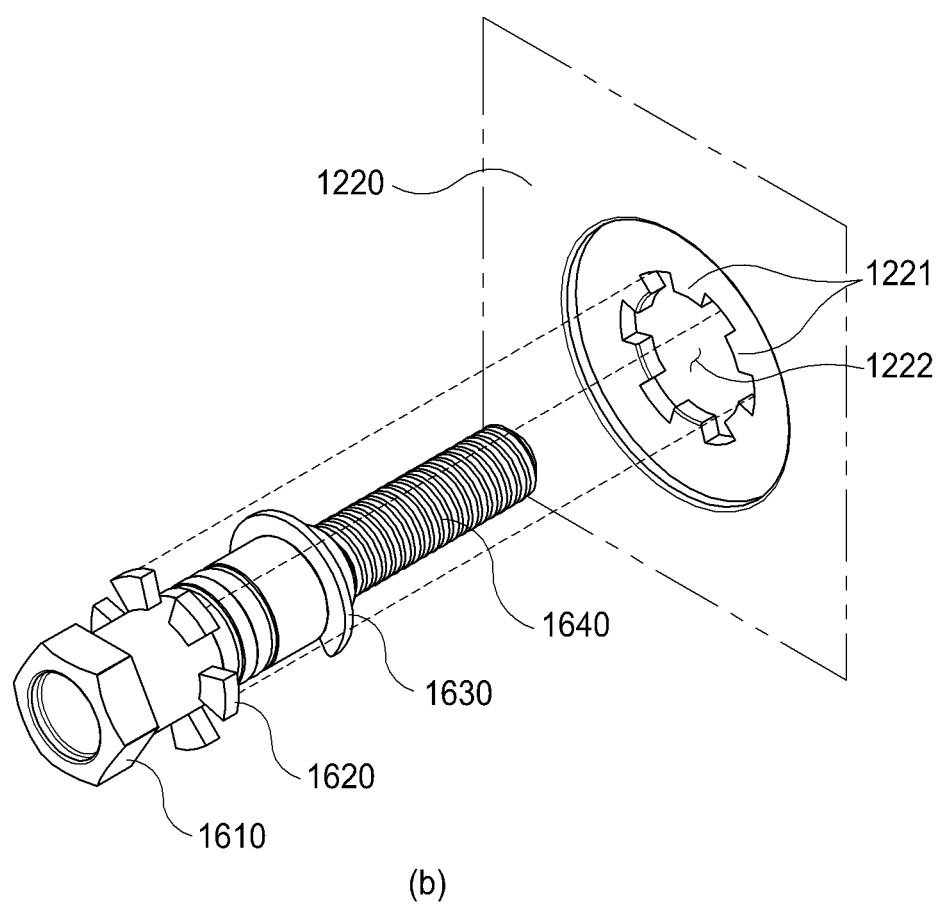
(b)

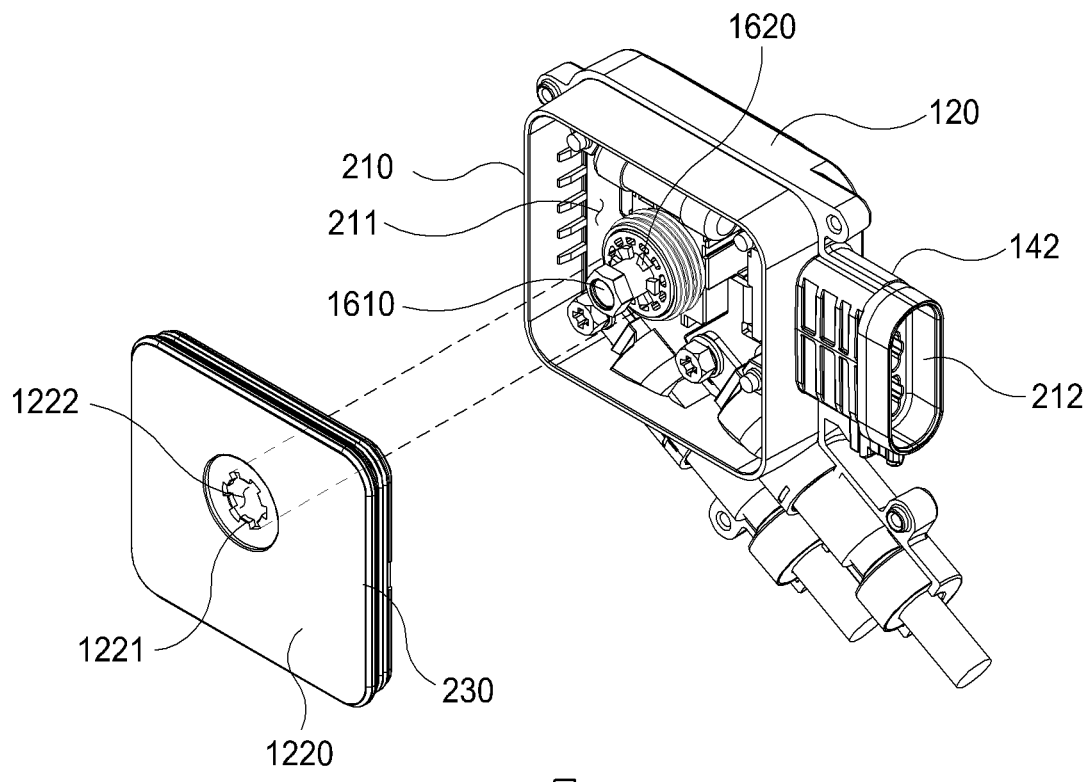
FIG. 22C
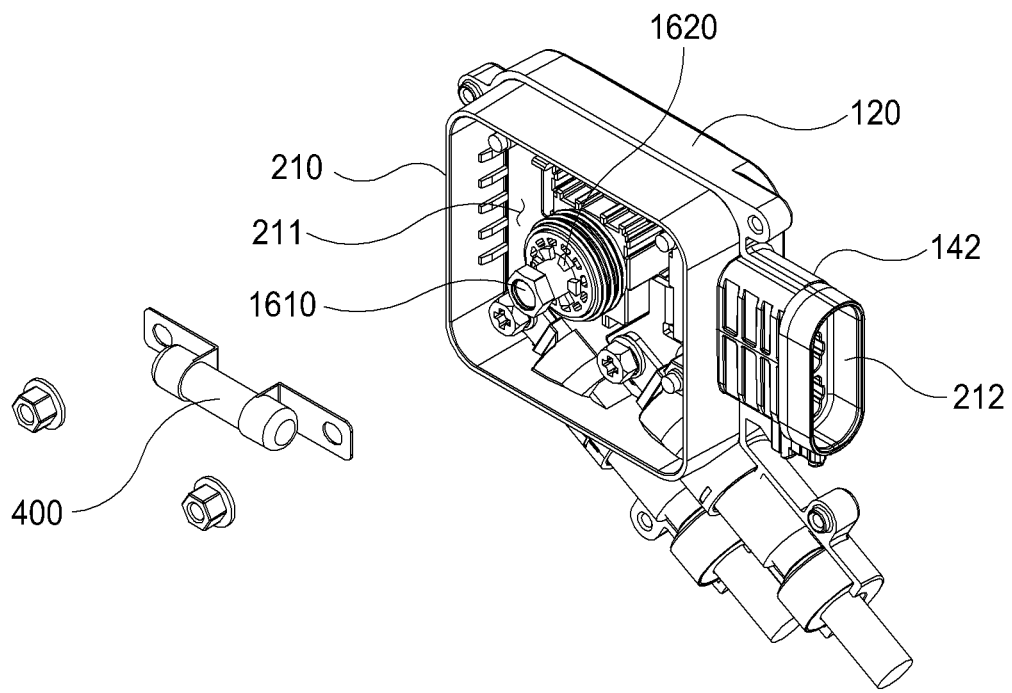

ELECTRONIC PART WITH INTEGRATED FUSE

CROSS-REFERENCE TO RELATED APPLICATIONS

This U.S. non-provisional patent application claims priority under 35 U.S.C. § 119 of Korean Patent Application No. 10-2020-0119815, filed on Sep. 17. 2020, the entire contents of which are hereby incorporated by reference.

FIELD OF THE INVENTION

The present invention relates to a fuse-integrated electronic component, and more particularly, to a fuse-integrated electronic component used in electric devices of vehicles.

BACKGROUND ART

In general, many electric devices are installed in a vehicle, and the electric devices are electrically connected to other electric devices or power sources through cables and connectors connected thereto.

Thus, a high voltage battery is installed in the vehicle to supply power to a number of electric devices, and an interlock terminal that is designed in the battery and is capable of turning off a fuse and a relay installed in the battery to cut off an abnormal high voltage when the abnormal high voltage occurs is provided for the safety of workers or passengers.

However, in the related art, the battery has to be disassembled to replace the fuse, thereby significantly deteriorating workability, and if the relay is fused, the high voltage is not cut off even when the interlock terminal is disconnected, thereby significantly deteriorating safety.

SUMMARY OF THE INVENTION

To solve the above-mentioned limitations, the present invention provides a fuse-integrated electronic component, which significantly improves safety and workability of a worker by cutting off power when replacing a fuse.

In accordance with an embodiment of the present invention, a fuse-integrated electronic component, which is connected to a power supply part, includes: an outer housing which is fixed by a first coupling member in a state in which first and second housings are engaged with each other to define an accommodation space and in which an extension part is disposed at one side thereof; an inner body installed in the accommodation space by a second coupling member to define a mounting space; a connector connected to the outer housing so that the extension part is accommodated therein; and a fuse installed in the mounting space to cut off a high voltage output to the connector, wherein the first coupling member is disposed to be coupled and released between the outer housing and the power supply part so that the first coupling member is released in a state of being separated from the power supply part.

The inner body may be provided with a second terminal electrically connected to the first terminal provided in the power supply part, and in a state of being separated from the power supply part, the first and second terminals may also be separated from each other to cut off the supply of the power.

The second coupling member may be coupled to a coupling part provided in the power supply part by passing through a through-hole of the inner body, wherein a body ascending end hooked on the inner body may be provided to be released so that the first and second terminals are separated together from each other.

The body ascending end may be disposed at a first position spaced apart from the through-hole in a state of being completely coupled to the coupling part and be disposed at a second position that is in contact with one side of the through-hole when the second coupling member is released to move by a first distance so as to move together with the inner body until the second coupling member is completely released, thereby separating the first and second terminals from each other.

The connector may be provided with an interlock terminal electrically connected to a relay installed inside the power supply part.

In accordance with another embodiment of the present invention, a fuse-integrated electronic component, which is connected to a power supply part, includes: an outer housing which is fixed by a first coupling member in a state in which first and second housings are engaged with each other to define an accommodation space and in which an extension part is disposed at one side thereof; an inner body installed in the accommodation space to define a mounting space; an inner cover that is in close contact with one side of the inner body to cover the mounting space; a second coupling member passing through a communication hole defined in the inner body and a through-hole defined in the inner cover at the same time; a connector connected to the outer housing so that the extension part is accommodated therein; and a fuse installed in the mounting space to cut off a high voltage output to the connector, wherein the second coupling member comprises a work head exposed to the outside of the outer housing so as to be engaged with a tool, a close contact end hooked on an outer surface of the inner cover to prevent the inner cover from being separated, a body ascending end hooked on one side of the through-hole, and a screw part having a screw thread to be coupled to a coupling part disposed in a power supply part, wherein the communication hole and the close contact end have the same shape and are disposed to correspond to predetermined positions by rotation of the second coupling member.

The inner body may be provided with a second terminal electrically connected to the first terminal provided in the power supply part, and as the first coupling part is released, the inner body may ascend together by the body ascending end so that, in a state in which the fuse-integrated electronic component is separated from the power supply part, the first and second terminals are also separated from each other to cut off the supply of the power.

The body ascending end may be disposed at a first position spaced apart from the through-hole in a state of being completely coupled to the coupling part and be disposed at a second position that is in contact with one side of the through-hole when the second coupling member is released to move by a first distance so as to move together with the inner body until the second coupling member is completely released, thereby separating the first and second terminals from each other.

The connector may be provided with an interlock terminal electrically connected to a relay installed inside the power supply part.

BRIEF DESCRIPTION OF THE DRAWINGS

The accompanying drawings are included to provide a further understanding of the present invention, and are incorporated in and constitute a part of this specification.

The drawings illustrate exemplary embodiments of the present invention and, together with the description, serve to explain principles of the present invention. In the drawings:

FIG. 8 is a schematic circuit diagram illustrating an example of FIG. 5;

FIG. 9 is a schematic circuit diagram illustrating another example of FIG. 5;

FIG. 15 is a cross-sectional view taken in a direction XV-XV of FIG. 14;

FIG. 19 is a view illustrating a shape depending on positions of a communication hole and a close contact end of FIG. 17;

FIG. 22A to 22C are views illustrating a process of replacing a fuse of the fuse connector of FIG. 20.

DETAILED DESCRIPTION OF THE PREFERRED EMBODIMENTS

Figure 1:
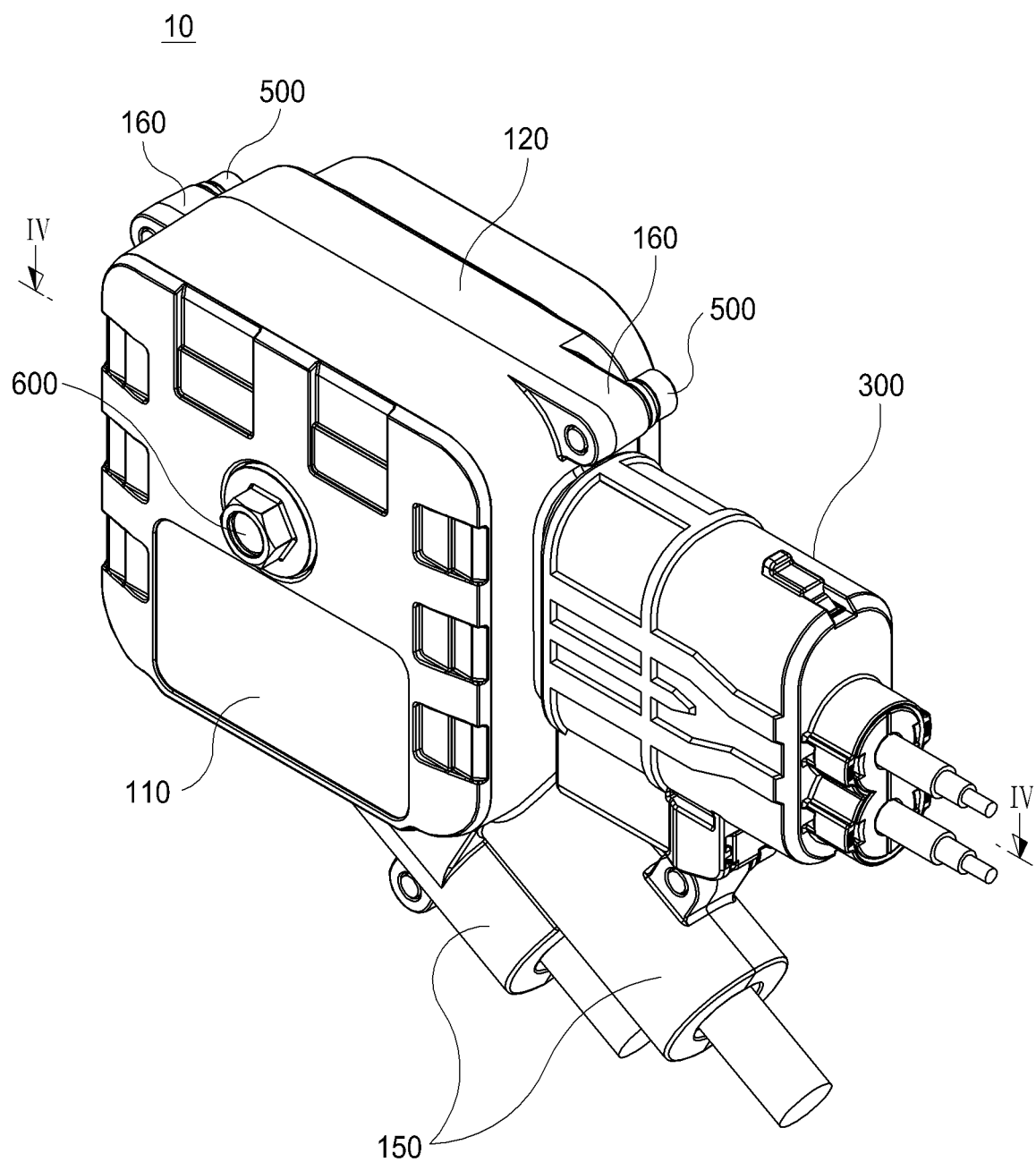
FIG. 1 is a perspective view of a fuse connector that is an example of a fuse-integrated electronic component according to a first embodiment of the present invention.

Hereinafter, specific embodiments of the present invention will be described in detail with reference to the drawings. However, in order not to obscure the gist of the present invention, detailed descriptions of well-known functions or configurations will be omitted.

In addition, for convenience of description of the invention, although the same reference numerals are given to a fuse connector corresponding to a fuse-integrated electronic component according to a first embodiment and a junction block, and the same reference numerals are given to a fuse connector corresponding to a fuse-integrated electronic component according to a second embodiment, only the best reference numeral may be changed and given to different components.

Figure 2:
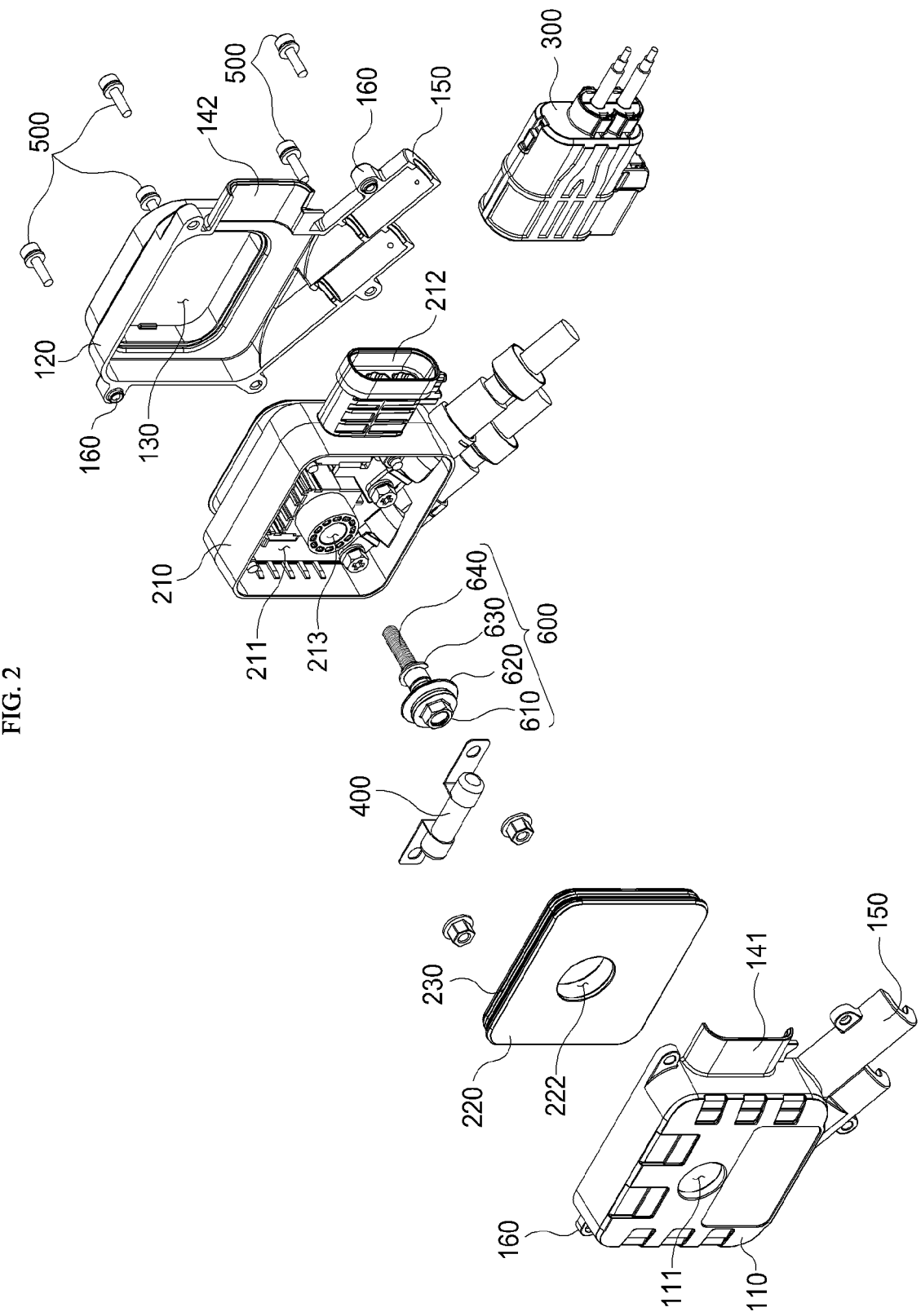
FIG. 2 is an exploded perspective view of FIG. 1.
Figure 3:
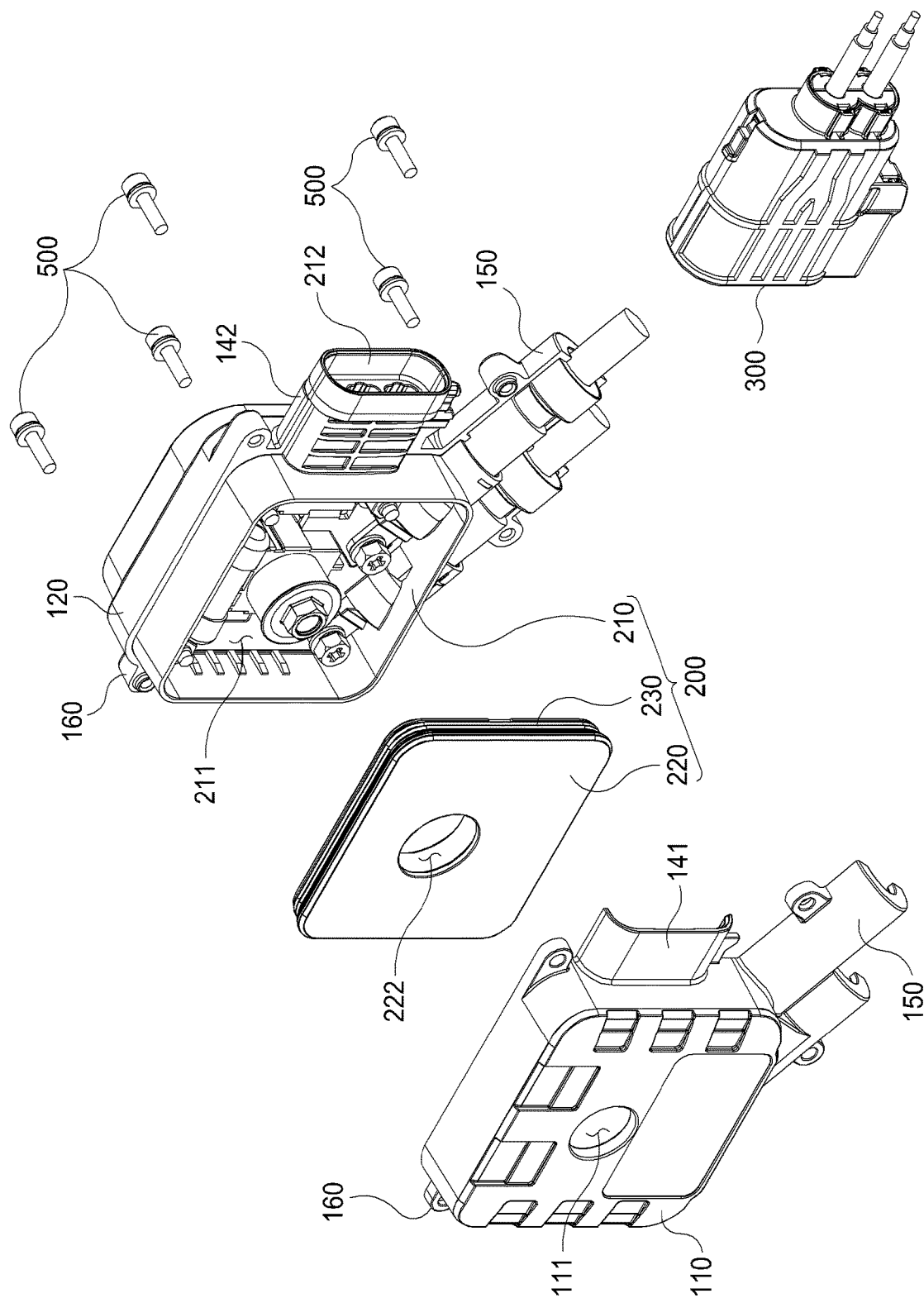
FIG. 3 is a perspective view illustrating a state in which a first housing and an inner cover are separated from each other in FIG. 1.
Figure 4:
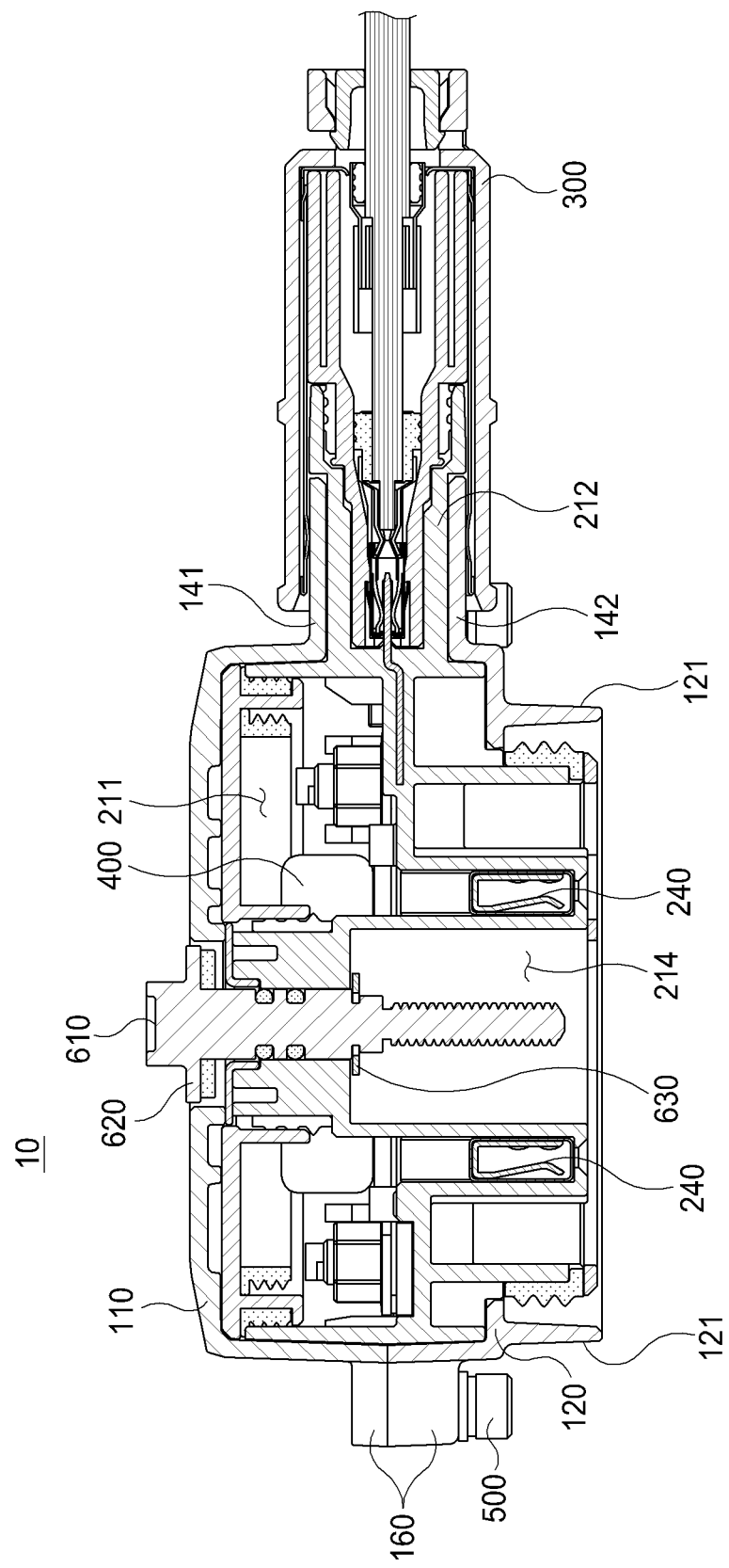
FIG. 4 is a cross-sectional view taken along line IV-IV of FIG. 1.
Figure 5:
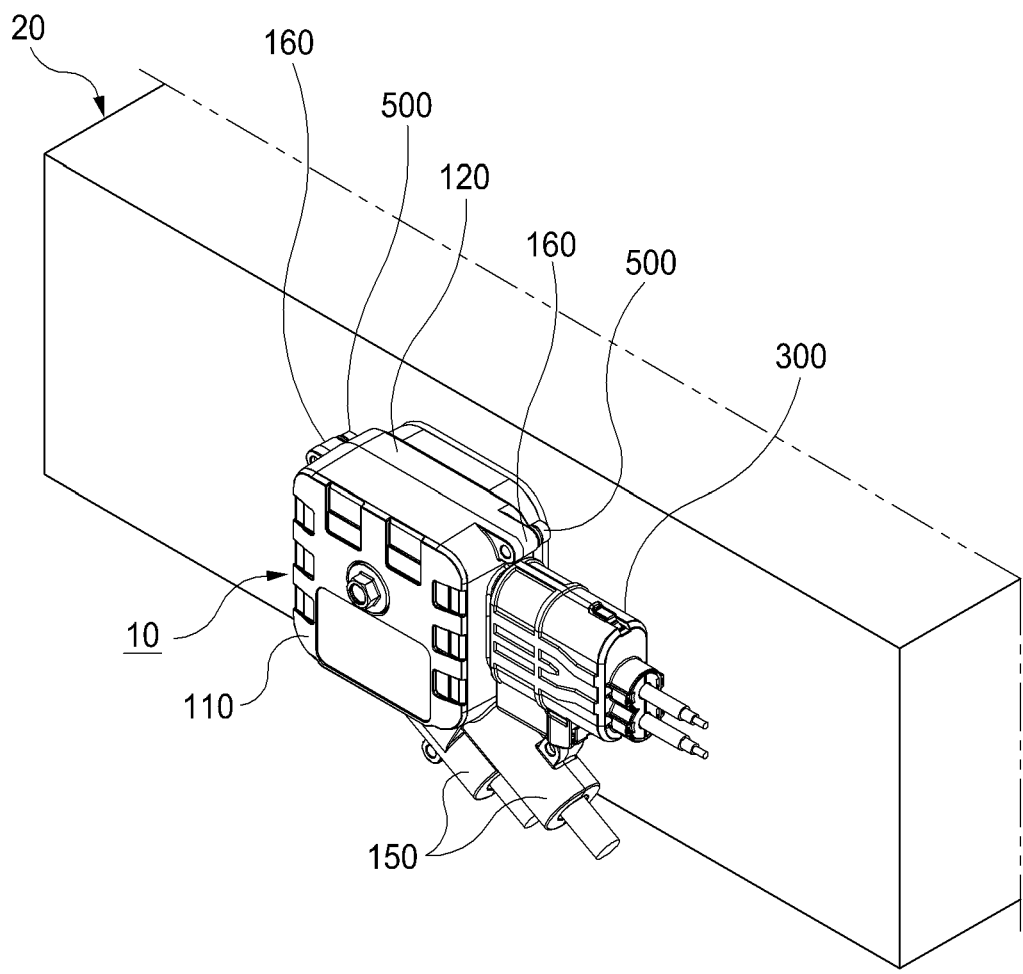
FIG. 5 is a perspective view illustrating a state in which the fuse connector of FIG. 1 is installed in a power supply part.
Figure 6:
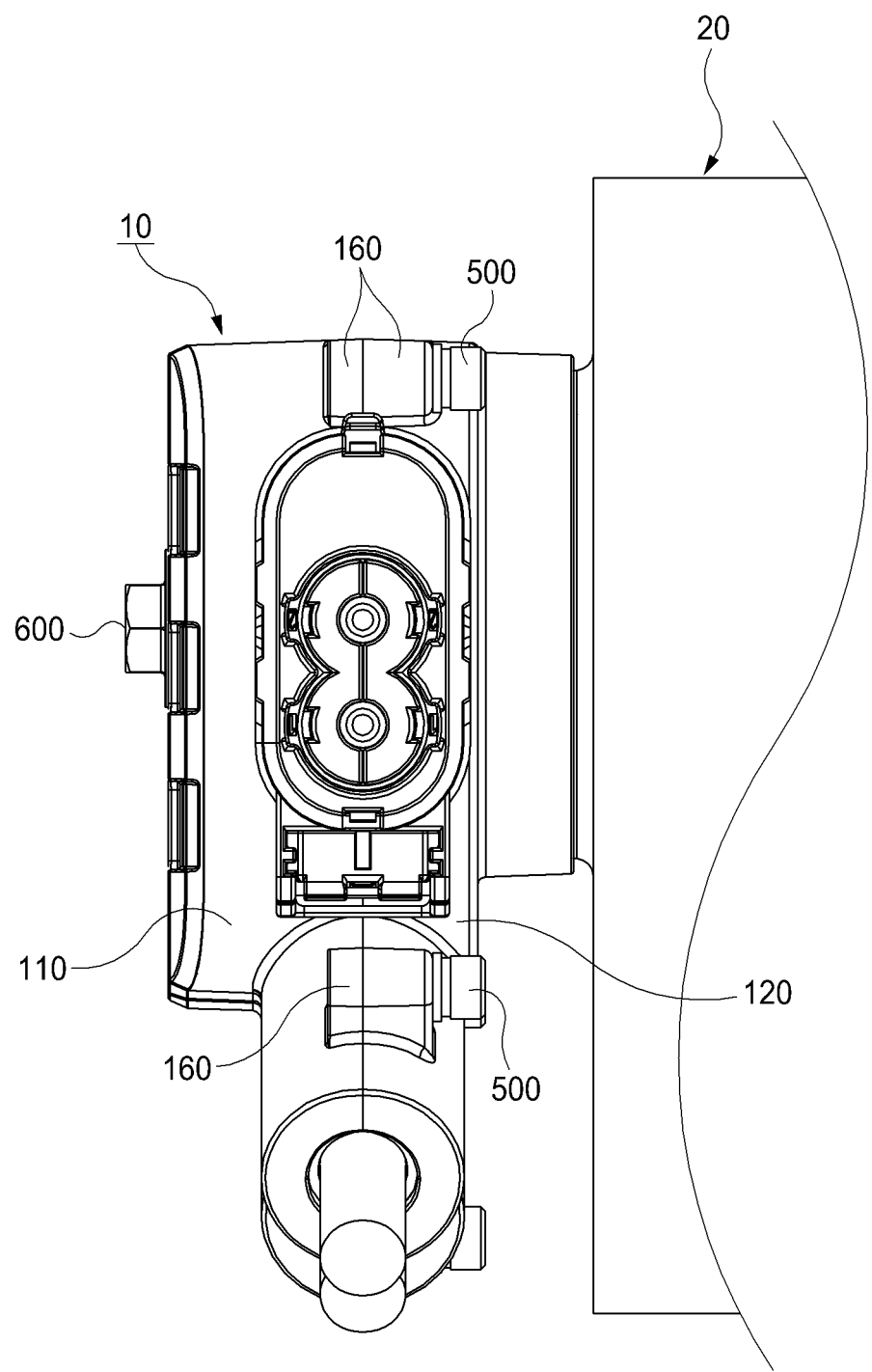
FIG. 6 is one side view of FIG. 5.
Figure 7:
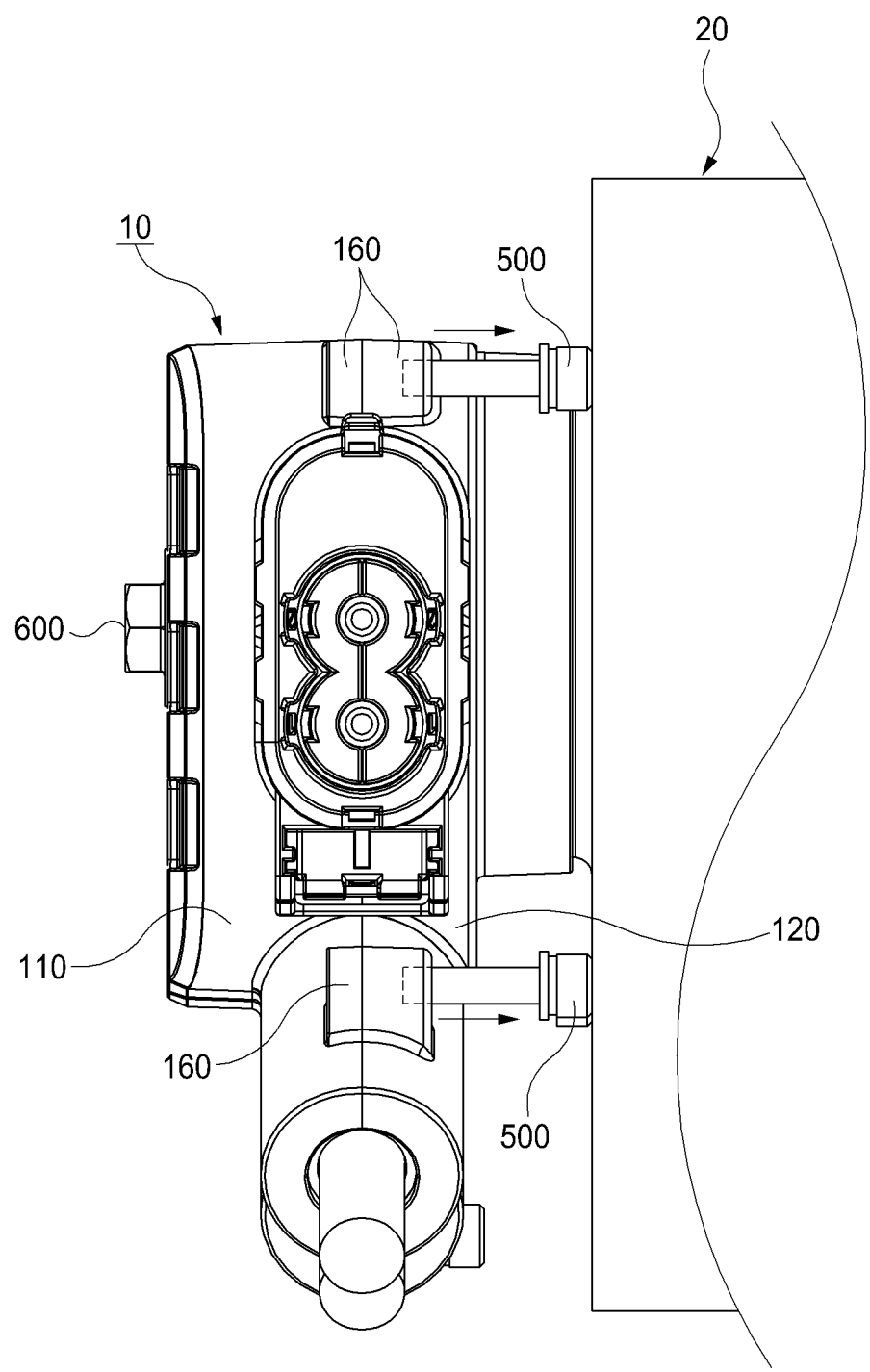
FIG. 7 is a view illustrating a state when a first coupling member is released in FIG. 6.
Figure 10A:
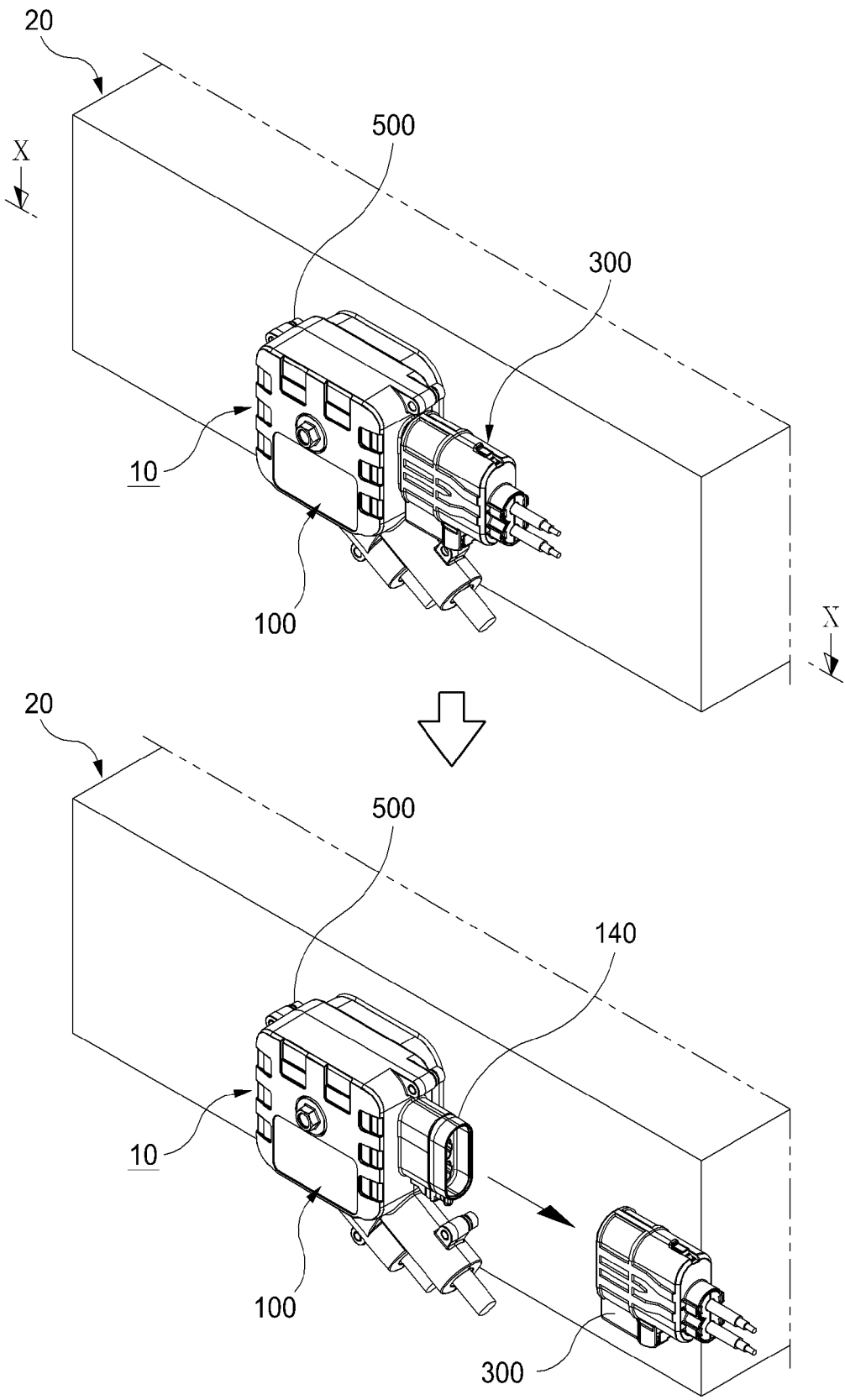
FIG. 10A to 10C are views illustrating a process of replacing a fuse of the fuse connector of FIG. 5.
Figure 10B:
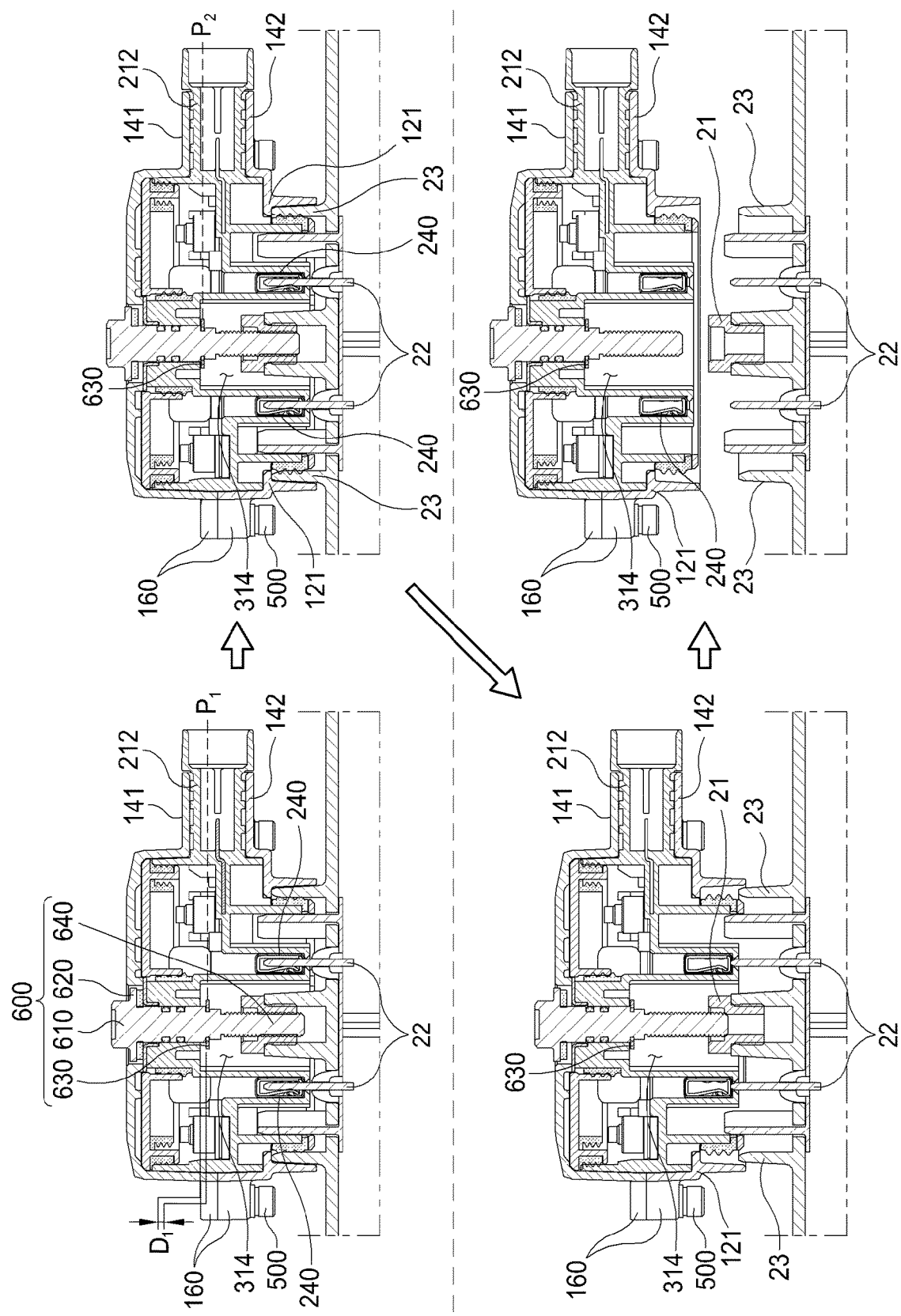
Figure 10C:
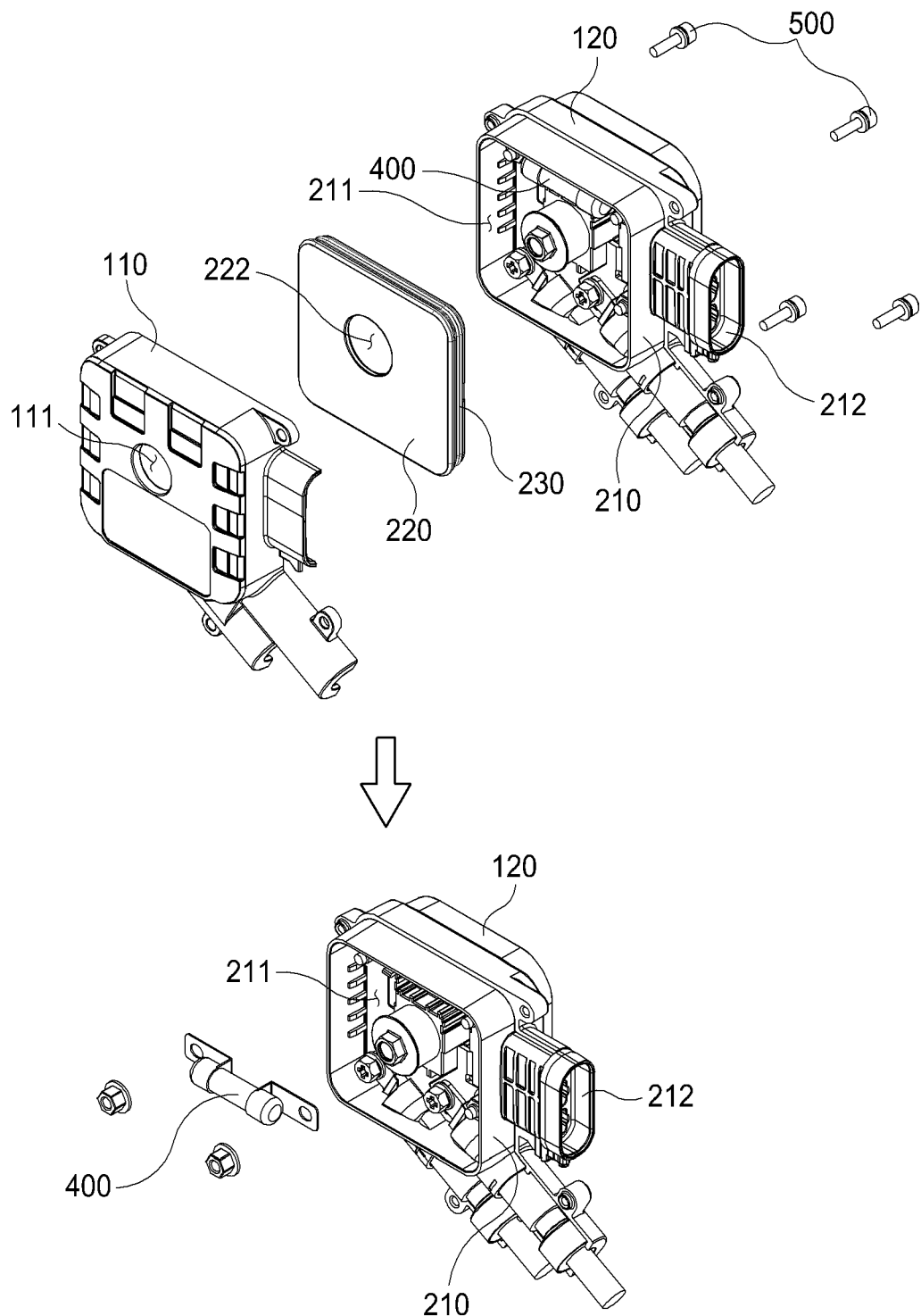

FIG. 1 is a perspective view of a fuse connector that is an example of a fuse-integrated electronic component according to a first embodiment of the present invention, FIG. 2 is an exploded perspective view of FIG. 1, FIG. 3 is a perspective view illustrating a state in which a first housing and an inner cover are separated from each other in FIG. 1, FIG. 4 is a cross-sectional view taken along line IV-IV of FIG. 1, FIG. 5 is a perspective view illustrating a state in which the fuse connector of FIG. 1 is installed in a power supply part, FIG. 6 is one side view of FIG. 5, and FIG. 7 is a view illustrating a state when a first coupling member is released in FIG. 6. FIG. 8 is a schematic circuit diagram illustrating an example of FIG. 5, and FIG. 9 is a schematic circuit diagram illustrating another example of FIG. 5. FIG. 10A to 10C are views illustrating a process of replacing a fuse of the fuse connector of FIG. 5.

Figure 11:
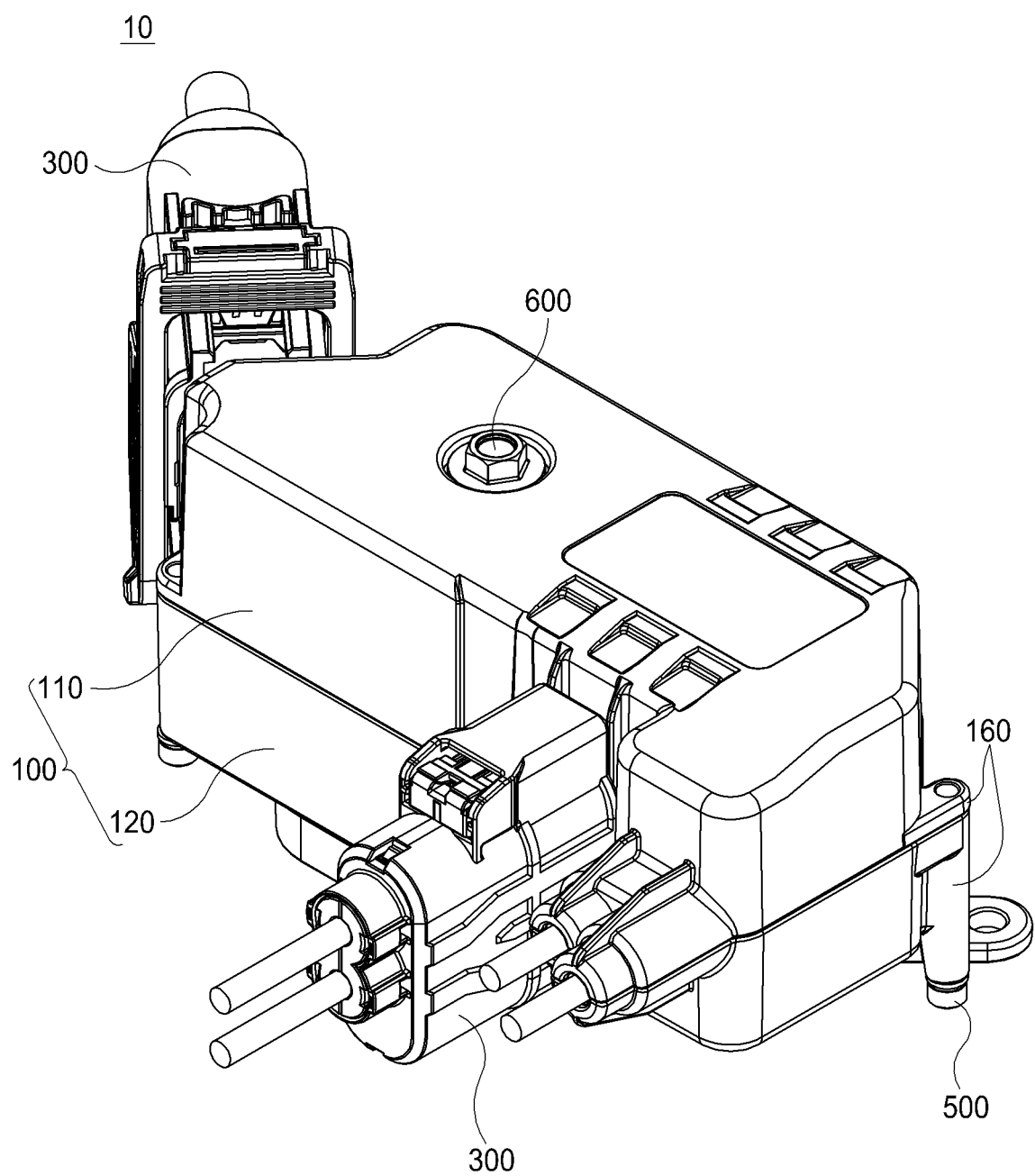
FIG. 11 is a perspective view illustrating a junction block that is another example of the fuse-integrated electronic component according to the first embodiment of the present invention.
Figure 12:
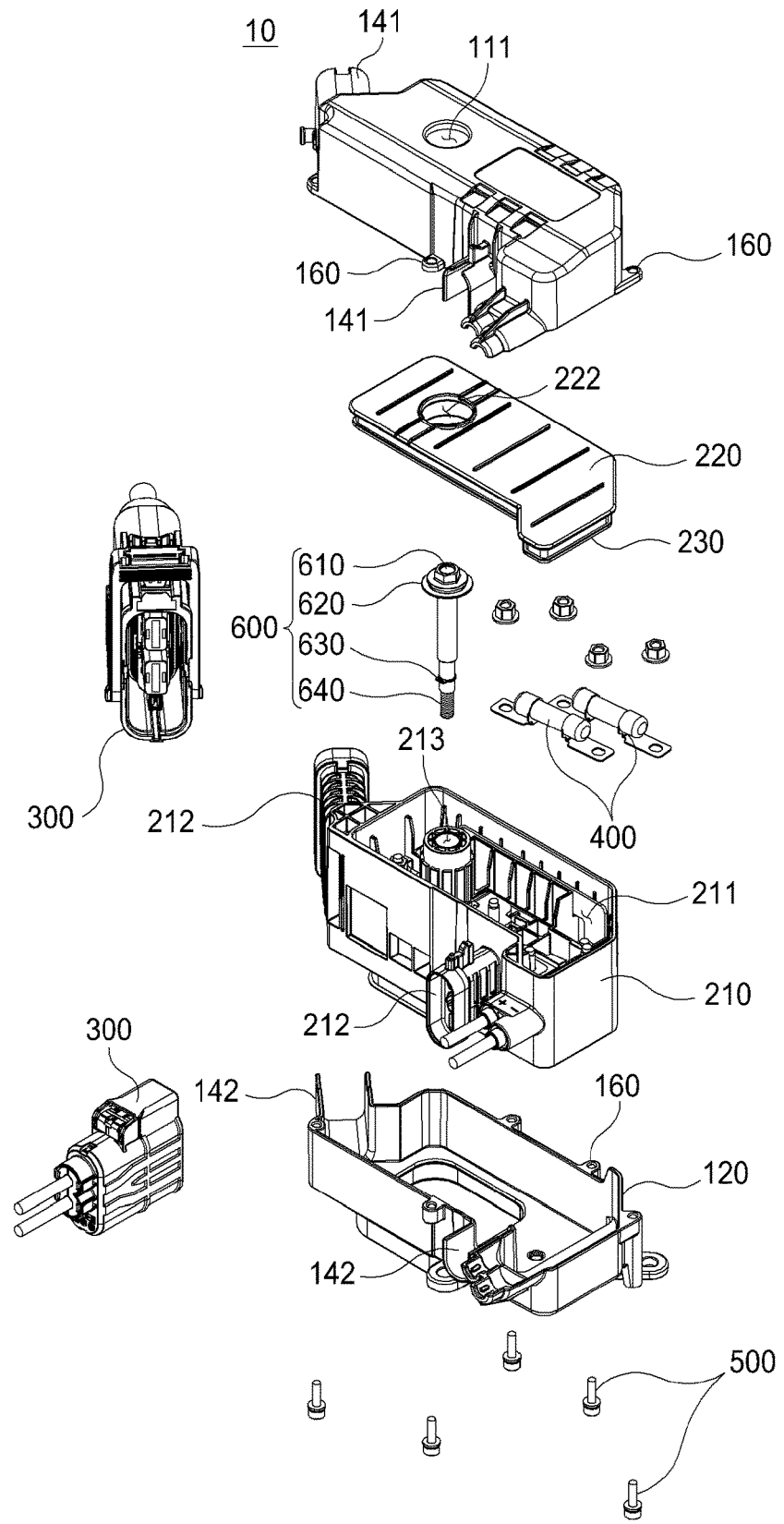
FIG. 12 is an exploded perspective view of FIG. 11.
Figure 13:
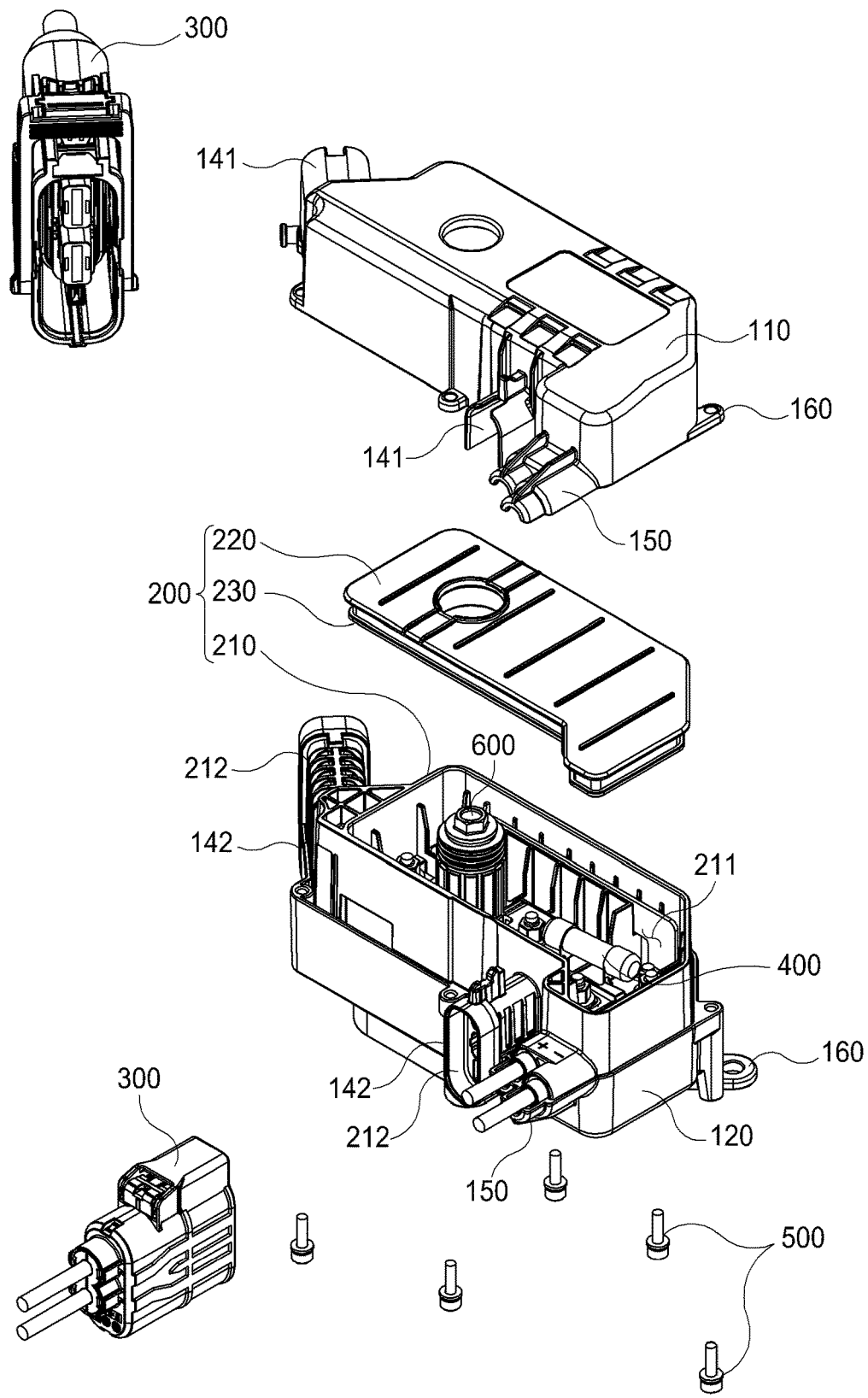
FIG. 13 is a perspective view illustrating a state in which the first housing and the inner cover are separated from each other in FIG. 11.
Figure 14:
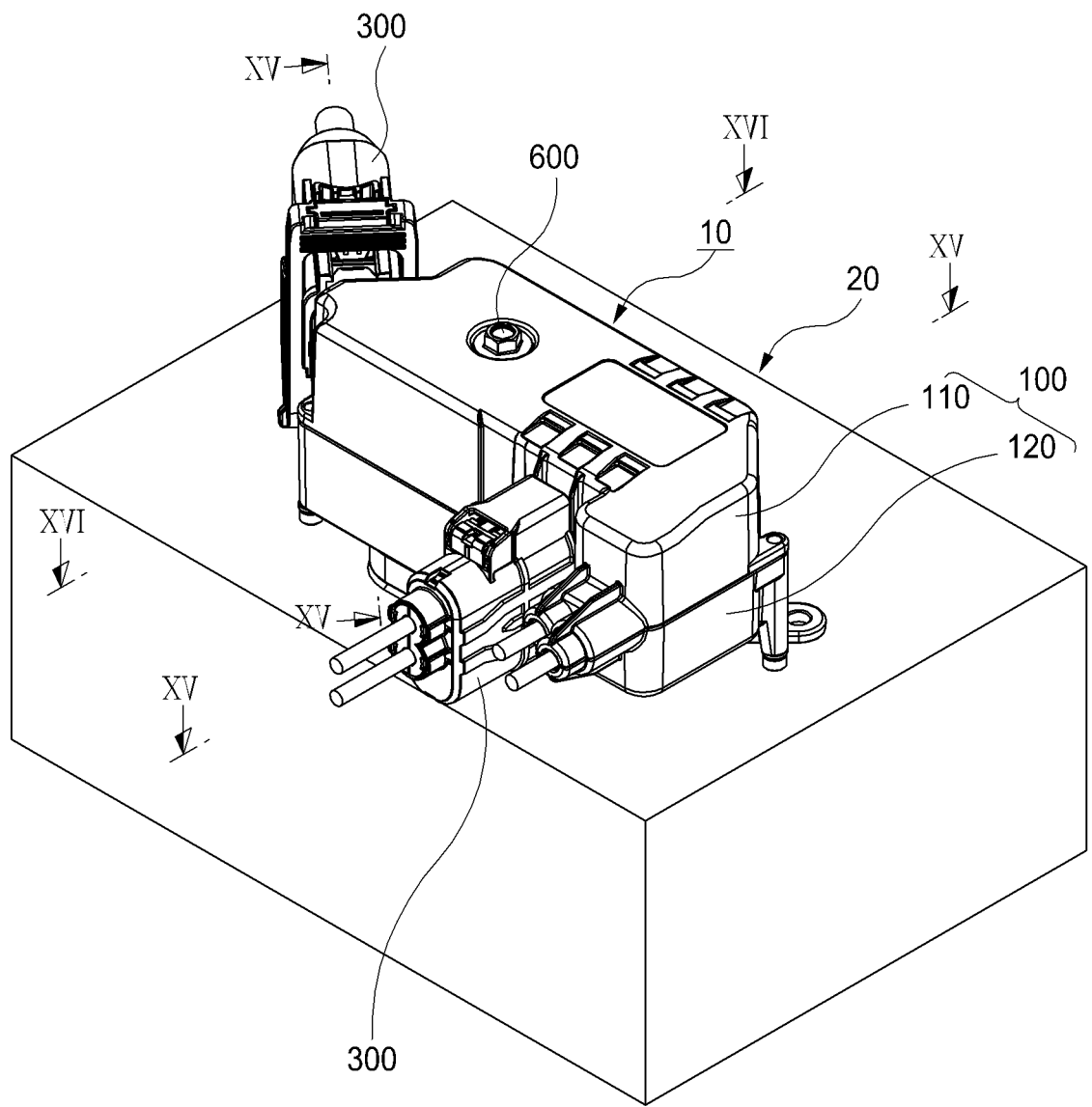
FIG. 14 is a perspective view illustrating a state in which the junction connector of FIG. 11 is installed in the power supply part.
Figure 16:
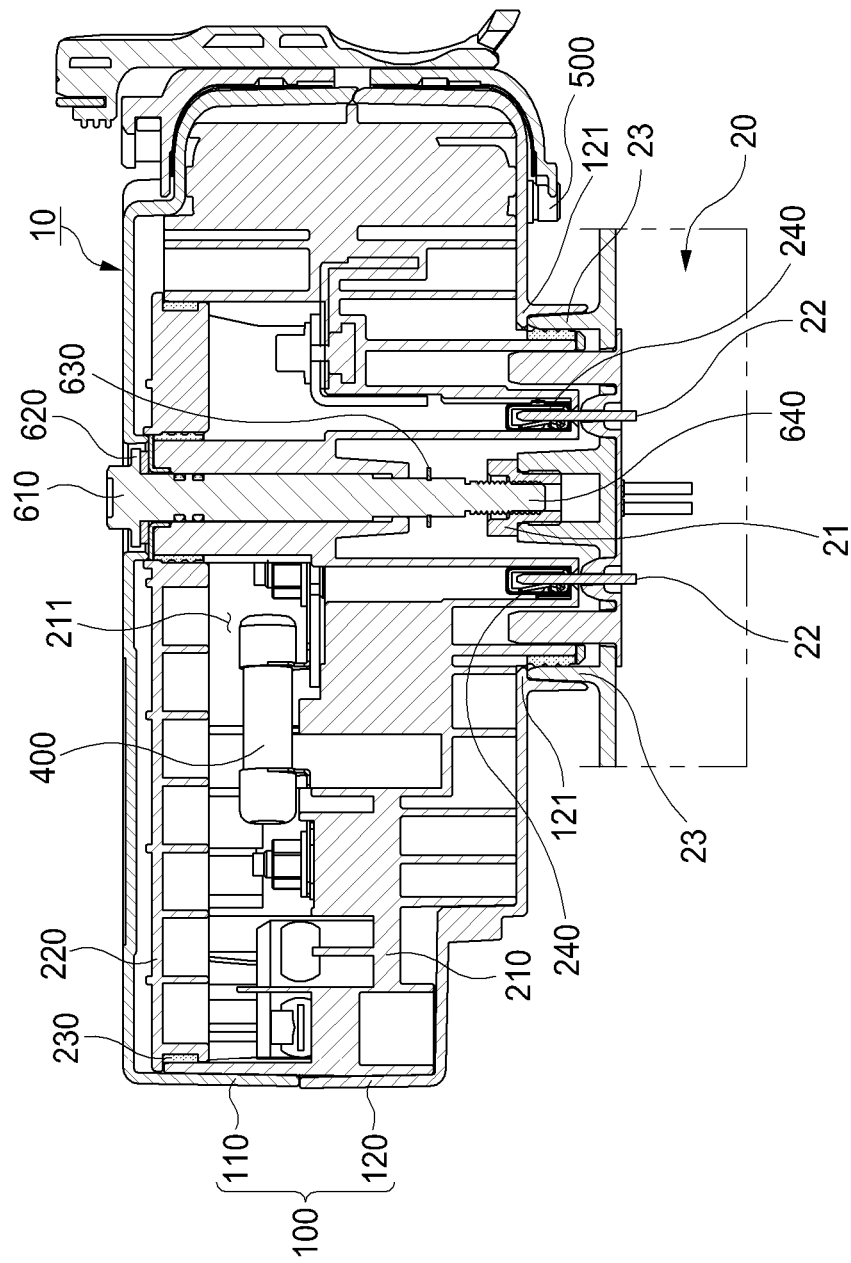
FIG. 16 is a cross-sectional view taken in a direction XVI-XVI of FIG. 14.

FIG. 11 is a perspective view illustrating a junction block that is another example of the fuse-integrated electronic component according to the first embodiment of the present invention, FIG. 12 is an exploded perspective view of FIG. 11, FIG. 13 is a perspective view illustrating a state in which the first housing and the inner cover are separated from each other in FIG. 11, FIG. 14 is a perspective view illustrating a state in which the junction connector of FIG. 11 is installed in the power supply part, FIG. 15 is a cross-sectional view taken in a direction XV-XV of FIG. 14, and FIG. 16 is a cross-sectional view taken in a direction XVI-XVI of FIG. 14.

Referring to FIGS. 1 to 16, a fuse-integrated electronic component 10 according to a first embodiment of the present invention includes an outer housing 100 which is fixed by a first coupling member 500 in a state in which first and second housings 110 and 120 are engaged with each other to define an accommodation space 130 and in which an extension part 140 is disposed at one side thereof, an inner body 210 installed in the accommodation space 130 by a second coupling member 600 to define a mounting space 211, a connector 300 connected to the outer housing 100 so that the extension part 140 is accommodated inside the connector 300 to supply power to the fuse-integrated electronic component 10, and a fuse 400 installed in the mounting space 211 to cut off a high voltage output to the connector 300. The fuse-integrated electronic component 10 is connected to a power supply part 20. The first coupling member 500 is disposed to be coupled and released between the outer housing 100 and the power supply part 20 so that the first coupling member 500 is released in a state of being separated from the power supply part 20.

Here, the fuse-integrated electronic component 10 may be a component through which a high voltage is input and output to supply or transmit electricity to another device or other components among components used in electric devices of a vehicle. Here, an installation of a fuse 400 is required for safety.

As an example, as illustrated in the drawings, the fuse connector, the junction block, etc. correspond to the fuse-integrated electronic component 10, and thus, the power supply part 20 corresponds to a battery, an inverter, etc. electrically connected thereto.

The outer housing 100 is constituted by the first and second housings 110 and 120 that are engage with each other to define the accommodation space 130 therein, and the extension part 140 is disposed at one side so that the connector 300 is connected to one side of the inner body 210.

Particularly, the first housing 110 is disposed outside the inner cover 220, and the second housing 120 is disposed outside the inner body 210 so that the inner housing 200 is accommodated in the internal communication space 130 defined between the first housing 110 and the second housing 120. Also, a first extension part 141 is disposed at one side of the first housing 110, and a second extension part 142 is disposed at one side of the second housing 120 so that the first and second housings 110 and 120 are engaged with each other, as a result, the first and second extension parts 141 and 142 are disposed to surround the outside of a connector connection part 212.

Thereafter, the first and second extension parts 141 and 142 are accommodated into the connector 300 electrically connected to the connector connection part 212. Here, the release of the connector 300 has to proceed in advance to separate the first and second housings 110 and 120 from each other, and then, a relay inside the power supply part 20 is turned off to cut off the high voltage.

In addition, a work hole 111 is defined in the first housing 110 to correspond to a position of a through-hole 213 to expose a work head 610 of the second coupling member 600 to the outside of the outer housing 100, thereby improving workability. The second housing 120 has both sides that are opened in a coupling/releasing direction of the second coupling member 600 so that a first terminal 22 disposed at one side of the power supply part 20 and a second terminal 240 embedded inside the inner body 210 are electrically connected to each other.

However, a hook protrusion 121 that is hooked on a hook rib disposed to protrude from the power supply part 20 so as to restrict an insertion of the fuse-integrated electronic component 10 is disposed at one side of the second housing 120 to prevent the first and second terminals 22 and 240 from being excessively inserted, thereby protecting the terminals and improving product reliability.

In addition, in the first and second housings 110 and 120, a cable connection part 150 in which a wire that outputs power to the outside is accommodated is provided to surround a cable when the first and second housings 110 and 120 are coupled to each other, thereby protecting the connected portions, and a first coupling hole 160 to which the first coupling member 500 is coupled is provided in plurality along a circumference of each of the first and second housings 110 and 120.

Here, the first coupling hole is opened in a coupling/releasing direction of the first coupling member 500 so that the first coupling member 500 is coupled in any direction. In the fuse-integrated electronic component 10 according to the first embodiment of the present invention, the separation of the power supply part 20 and the fuse-integrated electronic component 10 has to be essentially performed in advance to separate the outer housing 100 so that the first coupling member 500 is coupled and released between the second housing 120 and the power supply part 20.

In summary, the first and second housings 110 and 120 have a shape, in which the first and second housings 110 and 120 are engaged with each other to define the accommodation space 130 for accommodating the inner housing 200. The first coupling member 500 is coupled to the first coupling hole 160 to prevent the outer housing 100 from being separated without releasing the first coupling member 500, and the first coupling member 500 is inserted from the outside of the second housing 120 so that the fuse-integrated electronic component 10 and the power supply part 20 have to be essentially separated to separate the outer housing 100.

Therefore, in the fuse-integrated electronic component 10 according to the first embodiment of the present invention, the processes of releasing the connector 300 to be separated from the power supply part 20 has to essentially performed in advance so as to replace the fuse 400 installed in the mounting space 211. Thus, in the fuse-integrated electronic component 10 according to the present invention, the connector 300 is separated, and the first and second terminals 22 and 240 are separated from each other before replacing the fuse 400 to cut off the high voltage doubly, thereby significantly improving stability of the worker.

The inner housing 200 is provided with an inner body 210 accommodated in the accommodation space 130 and an inner cover 220 coupled to one side of the inner body 210 to protect components electrically connected to each other such as the fuse 400, a bus bar, the cable, and the like, which are installed in the mounting space 211 defined in the inner body 210.

The inner body 210 defines the mounting space 211 in which the components are installed, and the connector connection part 212 connected to the connector 300 is disposed at one side of the inner body 210. Also, the through-hole 213, through which the second coupling member 600 passes, and a coupling space 214, in which a coupling part 21 of the power supply part 20 is disposed to one side of the through-hole 213, are defined in the inner body 210. In addition, the second terminal 230 electrically connected to the first terminal 22 to correspond to the position of the first terminal 22 are embedded in the inner body 210.

The inner cover 220 is coupled to the inner body 210 to cover an opening of the mounting space 211, thereby protecting the components installed therein, and a communication hole 222 through which the work hole 111 and the through-hole 213 communicate with each other is defined in the inner cover 220 so that the second coupling member 600 is fixed to the coupling part 21.

Here, a packing 230 is disposed between the inner body 210 and the inner cover 220 to prevent moisture, impurities, etc. from being introduced into the mounting space 211.

In other words, in the fuse-integrated electronic component 10 according to the present invention, the components for the electrical connection are protected doubly by the inner housing 200 and the outer housing 100 to improve durability of the product, and also, the inner body 210, in which the mounting space 211, in which the components are substantially installed, is defined, is formed to enable a complex structure to be more easily formed through injection.

Here, the packing 230 is provided to offset an injection tolerance, and a hook protrusion 121 that is in contact with the hook rib 23 of the power supply part 20 to limit a degree of insertion of each of the fuse-integrated electronic component 10 and the power supply part 20 is disposed on the outer housing 100 so that the first and second terminals 22 and 240 are electrically connected to each other at a predetermined position to improve the reliability of the product.

The connector 300 is connected to the connector connection part 212 so as to be electrically connected to an external device and is provided in various types. Also, an interlock terminal is provided in the connector 300, and thus, when the interlock terminal is released from the connector connection part 212, a circuit electrically connected to the interlock terminal is electrically cut off to allow the relay provided in the power supply part 20 to be turned off.

In addition, the connector 300 accommodates the extension part 140 disposed in the outer housing 100 therein and is connected to the connector connection part 212. As a result, to separate the outer housing 100, the connector 300 has to be essentially released from the connector connection part 212, and thus, the interlock terminal is separated to turn off the relay disposed in the power supply part 20 so as to cut off the high voltage.

Therefore, the fuse-integrated electronic component 10 according to the present invention is provided with the interlock terminal inside the connector 300 so that the high voltage is cut off through the turn-off of the relay just by separating the connector 300, thereby realizing more stable work.

The second coupling member 600 includes a work head 610, a close contact end 620 disposed at one side of the through-hole 213, a body ascending end 630 disposed at the other side of the through-hole 213, and a screw part 640 that is screw-coupled to the coupling part 21 disposed in the power supply part 20 by passing through the through-hole 213, and thus, the second coupling member 600 is hooked to be fixed to the inner body 210 regardless of the coupling or releasing to/from the power supply part 20.

Here, a distance between the close contact end 620 and the body ascending end 630 is longer than a length of the through-hole 213 and is hooked to be fixed to the inner body 210, thereby fundamentally preventing the second coupling member 600 from being lost in the working process. Also, the second coupling member 600 is provided to be movable by a predetermined distance in the coupling direction so that the second coupling member 600 is easily located at the coupling part 21 by the worker to improve the workability.

Hereinafter, a method of disassembling the fuse 400 to replace a fuse 400 in a state in which the fuse-integrated electronic component 10 according to the first embodiment of the present invention is coupled to the power supply part 20 will be described in detail.

In the fuse-integrated electronic component 10 according to the first embodiment of the present invention, a power supply part 20 has to be separated for replacing the fuse 400 installed in a mounting space 211 in a state in which a high voltage is input or output in a state in which first and second terminals 22 and 240 are connected to each other.

Here, in the fuse-integrated electronic component 10, a connector 300 has to also be separated in a state in which the connector 300 is connected to a connector connection part 212, but an order in which the power supply part 20 and the connector 300 are separated is not limited. However, for convenience of description, the following description will be described based on the connector 300 being separated in advance.

To replace the fuse 400, the connector 300 connected to the connector connection part 212 is separated, and thus, an internal interlock terminal of the connector 300 is electrically cut off a relay of the power supply part 20. Therefore, the relay is in an OFF state, a high voltage is first cut off, and an extension part 140 accommodated in the connector 300 is also in a separable state.

Thereafter, it is common to remove a first housing 110 and an inner cover 220 so as to replace the fuse 400 therein, but when the relay is fused, the high voltage is not cut off simply by separating the interlock terminal. As a result, there is a limitation that safety of the work is significantly deteriorated because additional accidents occurs.

Therefore, in the fuse-integrated electronic component 10 according to the first embodiment of the present invention, a first coupling member 500 is coupled from the outside of a second housing 120 in a direction of the first housing 110 to prevent an outer housing 100 from being separated from first and second housings 110 and 120 when not separated from the power supply part 20.

Thus, a worker releases a second coupling member 600 in advance. Particularly, in the second coupling member 600, the body ascending end 630 is disposed at a first position P1 at which a body ascending end 630 is spaced a first distance D1 from a through-hole 213 in a state in which the second coupling member 600 is completely coupled to the coupling part 21, and the worker rotates a work head 610 through a tool to allow a screw part 640 to be released from the coupling part 21.

Here, as the screw part 640 is released from the coupling part 21, the second coupling member 600 moves to the outside of the first housing 110, and then, when the second coupling member 600 moves by a first distance D1, a body ascending end 630 is disposed at a second position P2 that is in contact with one side of a through-hole 213. As a result, the second coupling member 600 moves to ascend together with an inner body 210, and thus, the second coupling member 600 is fundamentally released so that the first and second terminals 22 and 240 are separated together from each other.

In other words, a distance in a linear direction to which the screw part 640 of the second coupling member 600 moves so as to be completely separated from the coupling part 21 of the power supply part 20 is equal to or greater than a distance at which the first and second terminals 22 and 240 are coupled to each other. Thus, to separate the fuse-integrated electronic component 10 from the power supply part 20, the release of the first and second terminals 22 and 240 essentially occurs to certainly secure worker's safety.

Thus, in the fuse-integrated electronic component 10, a mechanical coupling that is electrically connected to the power supply part 20 is separated to secondarily cut off the high voltage again. For this, the first and second terminals may have a coupling distance less than the linear distance of the screw coupling in which the screw part 640 and the coupling part 21 are coupled to each other.

As described above, when the second coupling member 600 is completely released from the coupling part 21, the fuse-integrated electronic component 10 is also separated from the power supply part 20 to improve workability, and the first coupling member 500 is also exposed so that the worker conveniently release the first coupling member 500 from a first coupling hole 160.

Therefore, after removing the first coupling hole 160, the worker separates the first housing 110 and the inner cover 220 from each other to more safely replace the electrically connected components such as a fuse 400 installed in a mounting space 211.

Also, the fuse connector corresponding to an example of the first embodiment of the present invention has a fuse 400 installed therein. Thus, a fuse 400 inside a battery, which corresponds to a power supply source, may be excluded to significantly improve workability during the replacement, thereby significantly reducing maintenance cost and man-hours.

In other words, the fuse-integrated electronic component 10 according to the first embodiment of the present invention discloses a new structure that doubly cuts off the high voltage to replace the fuse 400 to significantly improve the stability and workability of the worker. In addition, as described in the first embodiment, the fuse 400 is installed in the fuse connector to significantly reduce the number of man-hours for the typical releasing operation, thereby maximizing the effect of improving the workability.

Hereinafter, a fuse-integrated electronic component 1000 according to a second embodiment will be described. However, since the fuse-integrated electronic component 10 according to the first embodiment and the fuse-integrated electronic component 1000 according to the second embodiment have the same technical solution and have the same purpose and function, description of the same configuration will be omitted.

Figure 17:
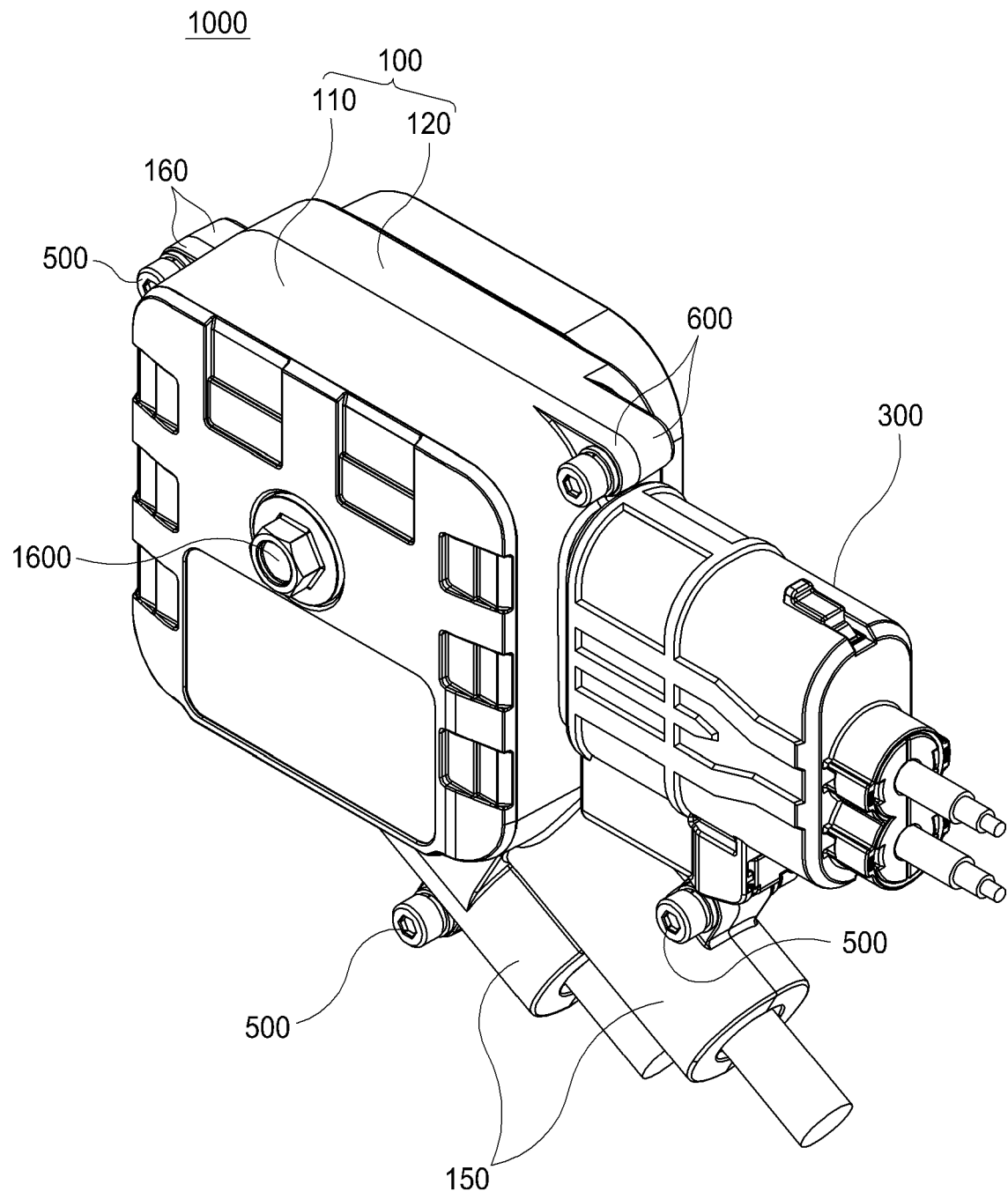
FIG. 17 is a perspective view of a fuse connector that is an example of a fuse-integrated electronic component according to a second embodiment of the present invention.
Figure 18:
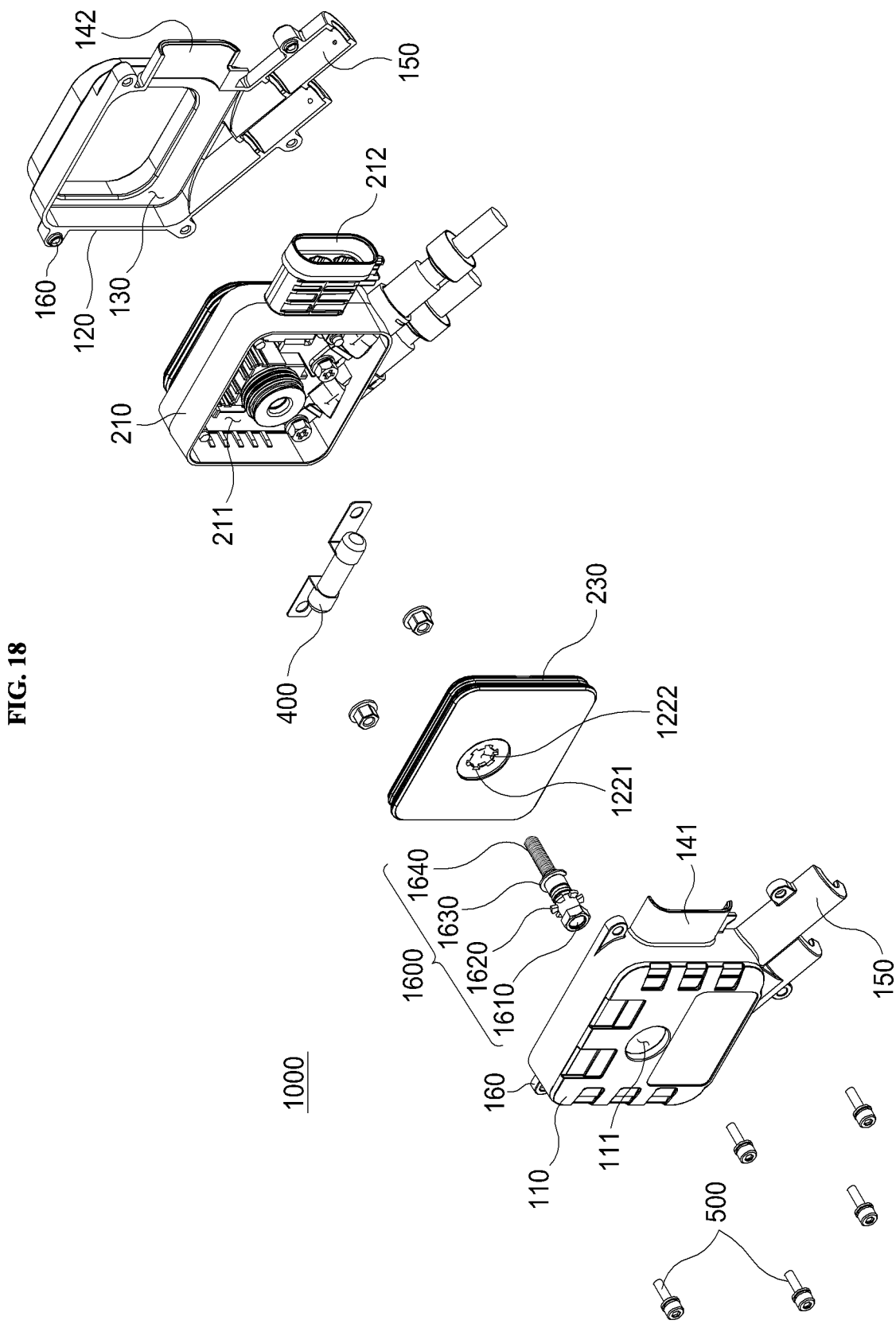
FIG. 18 is an exploded perspective view of FIG. 17.
Figure 20:
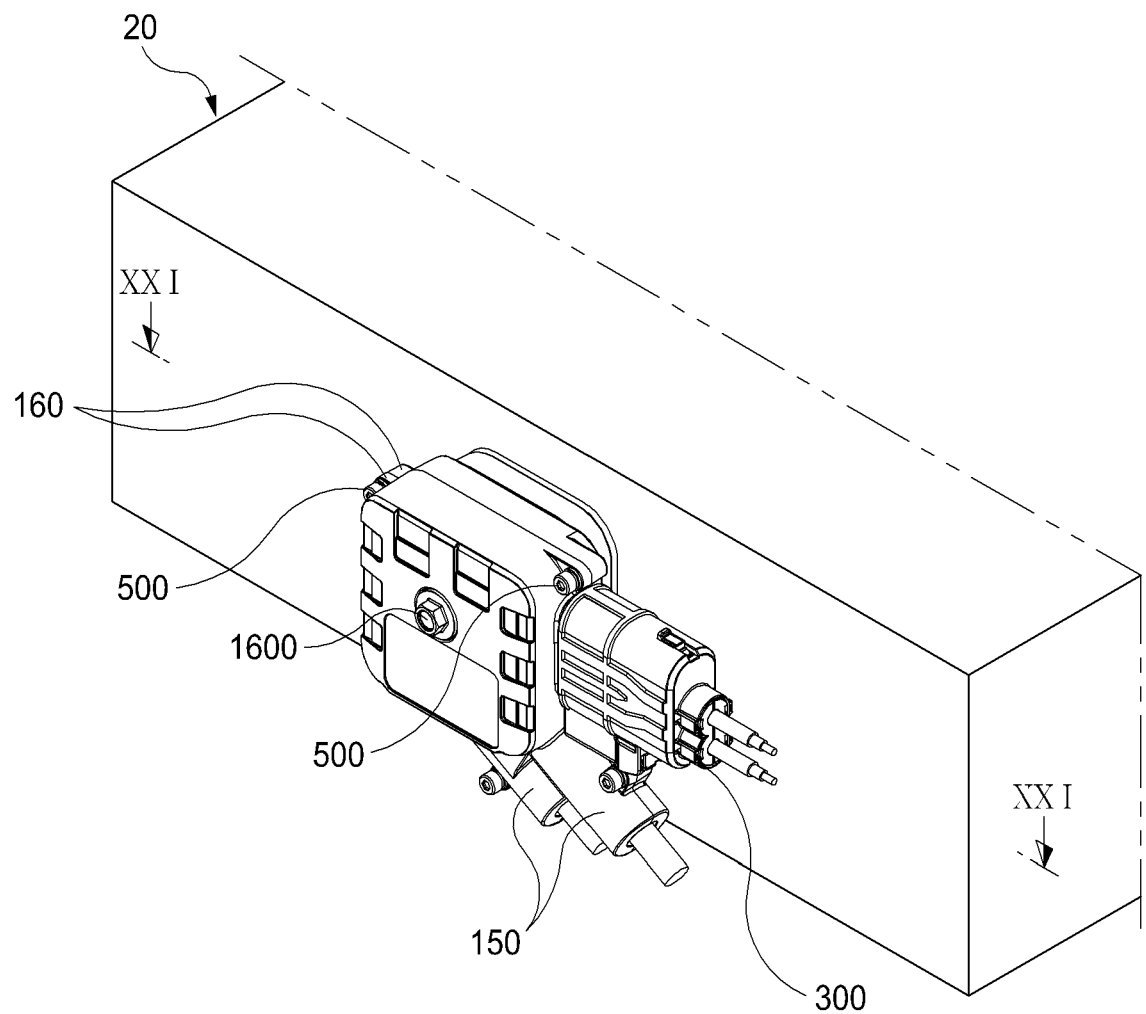
FIG. 20 is a perspective view illustrating a state in which the fuse connector of FIG. 17 is installed in a power supply part.
Figure 21:
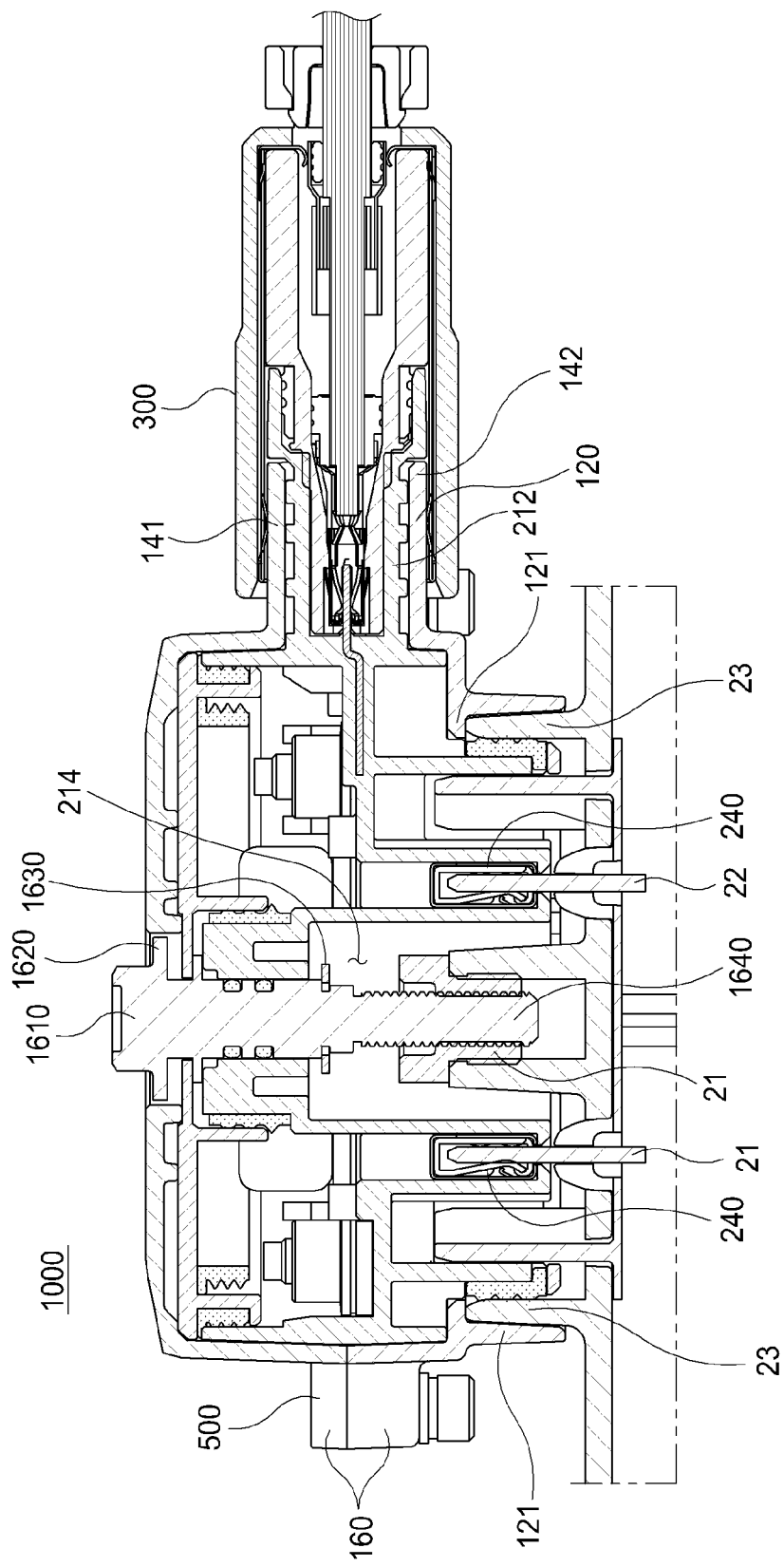
FIG. 21 is a cross-sectional view taken in a direction XX-XX of FIG. 20.
Figure 22A:
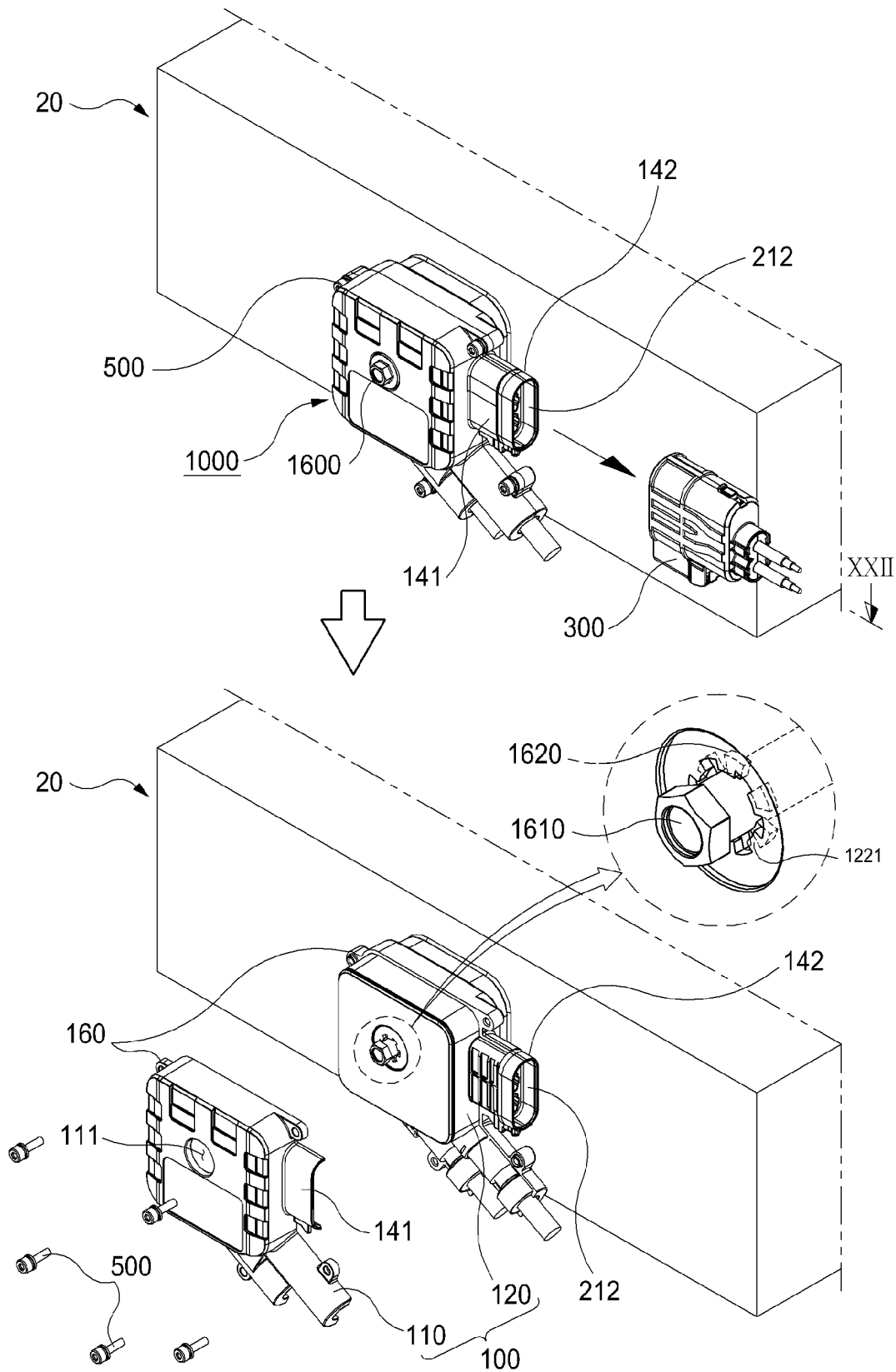
Figure 22B:
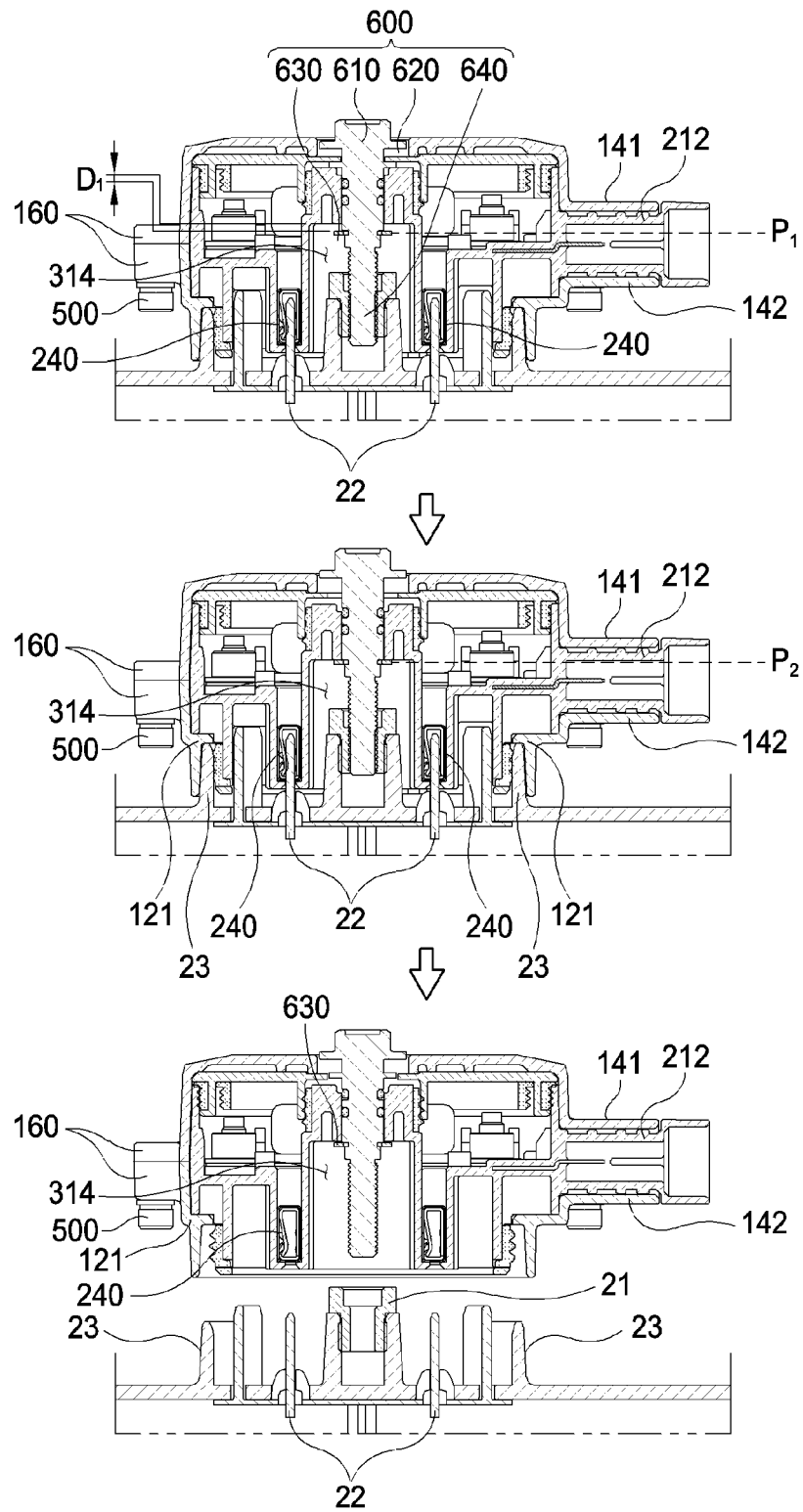

FIG. 17 is a perspective view of a fuse connector that is an example of a fuse-integrated electronic component according to a second embodiment of the present invention, FIG. 18 is an exploded perspective view of FIG. 17, and FIG. 19 is a view illustrating a shape depending on positions of a communication hole and a close contact end of FIG. 17. FIG. 20 is a perspective view illustrating a state in which the fuse connector of FIG. 17 is installed in a power supply part, FIG. 21 is a cross-sectional view taken in a direction XX-XX of FIG. 20, and FIG. 22A to 22C views illustrating a process of replacing a fuse of the fuse connector of FIG. 20.

Referring to FIGS. 17 to 20, a fuse-integrated electronic component 1000 according to a second embodiment of the present invention includes an outer housing 100 which is fixed by a first coupling member 500 in a state in which first and second housings 110 and 120 are engaged with each other to define an accommodation space 130 and in which an extension part 140 is disposed at one side thereof, an inner body 210 installed in the accommodation space 130 to define a mounting space 211, an inner cover 1220 that is in close contact with one side of the inner body 210 to cover the mounting space 211, a second coupling member 1600 passing through a communication hole 1222 defined in the inner body 210 and a through-hole 213 defined in the inner cover 1220 at the same time, a connector 300 connected to the outer housing 100 so that the extension part 140 is accommodated inside the connector 300 to supply power to the fuse-integrated electronic component 10, and a fuse 400 installed in the mounting space 211 to cut off a high voltage output to the connector 300. The second coupling member 1600 includes a work head 1610 exposed to the outside of the outer housing 100 so as to be engaged with a tool, a close contact end 1620 hooked on an outer surface of the inner cover 1220 to prevent the inner cover 1220 from being separated, a body ascending end 1630 hooked on one side of the through-hole 213, and a screw part 1640 having a screw thread to be coupled to a coupling part 21 disposed in a power supply part 20, and the communication hole 222 and the close contact end 1620 have the same shape and are disposed to correspond to predetermined positions by rotation of the second coupling member 1600.

The fuse-integrated electronic component 1000 according to the second embodiment of the present invention discloses a structure different from that according to the first embodiment so that the fuse 400 is removed, and simultaneously, the first coupling member 500 is coupled in a direction of a second housing 120 at the outside of the first housing 110.

For the above effect, in the inner cover 1220 of the fuse-integrated electronic component 1000 according to the second embodiment includes an extension end 1221 inside the communication hole 1222, and the close contact end 1620 of the second coupling member 1600 is disposed outside the inner cover 1220 to prevent the inner cover 1220 from being separated in a state in which the second coupling member 1600 is coupled to a coupling part 21.

Here, the extension end 1221 of the inner cover 1220 extends to have a specific shape along an inner circumferential surface of the communication hole 1222, and the close contact end 1620 of the second coupling member 1600 also has the same shape as the communication hole 1222 by the extension end 1221. Thus, the communication hole 1222 and the close contact end 1620 are disposed to correspond to each other only at predetermined positions so as to prevent the inner cover 1220 from being arbitrarily separated while the second coupling member 1600 is released, thereby securing safety.

Particularly, the shapes of the communication hole 1222 and the close contact end 1620 of the second coupling member 1600 by the extension end 1221 of the inner cover 1220 have a shape in which an uneven shape is repeated along a circumference as illustrated in FIG. 19. Here, when the two shapes do not match each other, the close contact end 1620 and one surface of the extension end 1221 are in contact with each other to prevent the inner cover 1220 from being separated. On the other hand, the inner cover may be separated at a position at which the two shapes overlap each other.

However, since this structures corresponds to an example of the communication hole 1222 and the close contact end 1620, the extension end 1221 may be provided as one protrusion or hole, and the close contact end 1620 may be provided as one hole or protrusion, which has a shape corresponding to the one protrusion or hole so that the inner cover 1220 is separated at only a specific position, which is capable of being variously changed by changing the design as needed.

Thus, the fuse-integrated electronic component 1000 according to the second embodiment of the present invention is not limited by the coupling direction of the first coupling member 500, and thus provides improved usability in relation to surrounding components.

Hereinafter, a method of disassembling the fuse 400 to replace a fuse 400 in a state in which the fuse-integrated electronic component 1000 according to the second embodiment of the present invention is coupled to the power supply part 20 will be described in detail.

In the fuse-integrated electronic component 10 according to the second embodiment of the present invention, a power supply part 20 has to be separated for replacing the fuse 400 installed in a mounting space 211 in a state in which a high voltage is input or output in a state in which first and second terminals 22 and 240 are connected to each other.

Here, in the fuse-integrated electronic component 10, a connector 300 has to also be separated in a state in which the connector 300 is connected to a connector connection part 212, but an order in which the power supply part 20 and the connector 300 are separated is not limited. However, for convenience of description, the following description will be described based on the connector 300 being separated in advance.

To replace the fuse 400, the connector 300 connected to the connector connection part 212 is separated, and thus, an internal interlock terminal of the connector 300 is electrically cut off a relay of the power supply part 20. Therefore, the relay is in an OFF state, a high voltage is first cut off, and an extension part 140 accommodated in the connector 300 is also in a separable state.

Thereafter, it is common to remove a first housing 110 and an inner cover 1220 so as to replace the fuse 400 therein, but when the relay is fused, the high voltage is not cut off simply by separating the interlock terminal. As a result, there is a limitation that safety of the work is significantly deteriorated because additional accidents occurs.

Thus, in the fuse-integrated electronic component 1000 according to the second embodiment of the present invention, the first coupling member 500 may be removed in the state of being coupled to the power supply part 20 so that the first housing 110 is separated. However, the inner cover 1220 may not be separated by the second coupling member 1600, and thus, the second coupling member 1600 has to be released in advance to replace the fuse 400 installed in the mounting space 211.

Thus, a worker releases a second coupling member 1600 first. Particularly, in the second coupling member 1600, the body ascending end 1630 is disposed at a first position P1 at which a body ascending end 630 is spaced a first distance D1 from a through-hole 213 in a state in which the second coupling member 600 is completely coupled to the coupling part 21, and the worker rotates a work head 1610 through a tool to allow a screw part 1640 to be released from the coupling part 21.

Here, as the screw part 1640 is released from the coupling part 21, the second coupling member 1600 moves to the outside of the first housing 110, and then, when the second coupling member 1600 moves by a first distance D1, a body ascending end 1630 is disposed at a second position P2 that is in contact with one side of a through-hole 213. As a result, the second coupling member 1600 moves to ascend together with an inner body 1210, and thus, the second coupling member 1600 is fundamentally released so that the first and second terminals 22 and 240 are separated together from each other.

Thus, in the fuse-integrated electronic component 1000, a mechanical coupling that is electrically connected to the power supply part 20 is separated to secondarily cut off the high voltage again. For this, the first and second terminals 22 and 240 may have a coupling distance less than the linear distance of the screw coupling in which the screw part 1640 and the coupling part 21 are coupled to each other.

In addition, when the second coupling member 1600 is completely released from the coupling part 21, it is hooked to be fixed to the inner body 210 by the close contact end 1620 and the body ascending end 1630. However, since it is freely rotatable, the worker rotates the second coupling member 1600 to adjust the communication hole 222 and the close contact end 1620 so as to match each other, and then, the inner cover 1220 is separated from the inner body 210 to replace the fuse 400.

Therefore, the fuse-integrated electronic component 1000 according to the second embodiment of the present invention improves a degree of freedom of a design regardless of the coupling direction of the first coupling member 500, and when replacing components such as the fuse 400 installed therein, the high voltage is primarily cut off through a relay and secondarily block the direction connection by separating the first and second terminals 22 and 240 from each other, thereby enabling the safer work.

In summary, the fuse-integrated electronic components 10 and 1000 according to the present invention disclose the coupling structure that is capable of doubly cutting off the high voltage when replacing the components such as the internal fuse 400 so that the worker performs the replacement work more safely, and the workability is improved to reduce maintenance costs.

As described above, various effects including the following facts may be expected according to the technical problems of the present invention. However, it is unnecessary to allow all of the following effects to be exerted.

In the fuse-integrated electronic component according to the present invention, the extension parts that are engaged with each other may be provided at one side of the first and second housings defining the outer housing, and also, the extension parts may be accommodated into the connector, and thus, the high voltage connector has to be removed for replacing the fuse installed inside the connector so as to ensure the stability.

In addition, the fuse-integrated electronic component may have the structure capable of being applied to the junction block connected to the inverter and the structure capable of being applied by directly installing the fuse in the connector connected to the battery. Therefore, the versatility of the fuse-integrated electronic component may be very high, and the workability of replacing the fuse may be improved.

The second coupling member may be provided with the close contact end and the body ascending end so as to be hooked and fixed to the inner body so that the second coupling member is prevented from being lost when the outer housing and the inner cover are separated from each other to disassemble the fuse, and simultaneously, allows the inner housing to ascend so that the first and second terminals are separated from each other to cut off the power doubly, thereby significantly improving the stability of the worker.

The first coupling member of the fuse-integrated electronic component according to the first embodiment may be disposed to be coupled and released between the outer housing and the power supply part so that the first and second terminals are essentially separated from each other to disassemble the outer housing, thereby maximizing the effect of improving the stability.

In the fuse-integrated electronic component according to the second embodiment, the second coupling member may be hooked and fixed to the inner body so as not to be restricted in the direction in which the first coupling member is coupled and released, and simultaneously, to fix the inner cover to induce the proceeding separation of the first and second terminals, thereby maintaining the effect of improving the stability.

Although the exemplary embodiment of the present invention is illustratively described, the technical scope of the present invention is not limited to only the specific embodiment, and thus all suitable modifications and equivalents coming with the scope of the appended claims.

What is claimed is:

1. A fuse-integrated electronic component, which is connected to a power supply part, the fuse-integrated electronic component comprising:
   an outer housing which is fixed by a first coupling member in a state in which first and second housings are engaged with each other to define an accommodation space and in which an extension part is disposed at one side thereof;
   an inner body installed in the accommodation space by a second coupling member to define a mounting space;
   a connector connected to the outer housing so that the extension part is accommodated therein; and
   a fuse installed in the mounting space to cut off a high voltage output to the connector,
   wherein the first coupling member is disposed to be coupled and released between the outer housing and the power supply part so that the first coupling member is released in a state of being separated from the power supply part,
   wherein the inner body is provided with a second terminal electrically connected to the first terminal provided in the power supply part, and in a state of being separated from the power supply part, the first and second terminals are also separated from each other to cut off the supply of the power, wherein the second coupling member is coupled to a coupling part provided in the power supply part by passing through a through-hole of the inner body, wherein a body ascending end hooked on the inner body is provided to be released so that the first and second terminals are separated together from each other, and wherein the body ascending end is disposed at a first position spaced apart from the through-hole in a state of being completely coupled to the coupling part and is disposed at a second position that is in contact with one side of the through-hole when the second coupling member is released to move by a first distance so as to move together with the inner body until the second coupling member is completely released, thereby separating the first and second terminals from each other.

2. The fuse-integrated electronic component of claim 1, further comprising an inner cover that is in close contact with one side of the inner body to cover the mounting space.

3. The fuse-integrated electronic component of claim 1, wherein the connector is provided with an interlock terminal electrically connected to a relay installed inside the power supply part.

4. A fuse-integrated electronic component, which is connected to a power supply part, the fuse-integrated electronic component comprising:

an outer housing which is fixed by a first coupling member in a state in which first and second housings are engaged with each other to define an accommodation space and in which an extension part is disposed at one side thereof;

an inner body installed in the accommodation space to define a mounting space;

an inner cover that is in close contact with one side of the inner body to cover the mounting space;

a second coupling member passing through a communication hole defined in the inner body and a through-hole defined in the inner cover at the same time;

a connector connected to the outer housing so that the extension part is accommodated therein; and a fuse installed in the mounting space to cut off a high voltage output to the connector, wherein the second coupling member comprises a work head exposed to the outside of the outer housing so as to be engaged with a tool, a close contact end hooked on an outer surface of the inner cover to prevent the inner cover from being separated, a body ascending end hooked on one side of the through-hole, and a screw part having a screw thread to be coupled to a coupling part disposed in a power supply part, wherein the communication hole and the close contact end have the same shape and are disposed to correspond to predetermined positions by rotation of the second coupling member, and wherein the body ascending end is disposed at a first position spaced apart from one side of the through-hole in a state of being completely coupled to the coupling part and is disposed at a second position that is in contact with one side of the through-hole when the second coupling member is released to move by a first distance to move together with the inner body until the second coupling member is completely released, thereby separating the first and second terminals from each other.

5. The fuse-integrated electronic component of claim 4, wherein the inner body is provided with a second terminal electrically connected to the first terminal provided in the power supply part, and as the first coupling part is released, the inner body ascends together by the body ascending end so that, in a state in which the fuse-integrated electronic component is separated from the power supply part, the first and second terminals are also separated from each other to cut off the supply of the power.

6. The fuse-integrated electronic component of claim 4, wherein the connector is provided with an interlock terminal electrically connected to a relay installed inside the power supply part.

* * * * *